United States Patent
Kobayashi

(10) Patent No.: US 11,500,317 B2
(45) Date of Patent: Nov. 15, 2022

(54) IMAGE FORMING APPARATUS FOR CONTROLLING IMAGE FORMING CONDITION BASED ON RECORDING MATERIAL TYPE

(71) Applicant: CANON KABUSHIKI KAISHA, Tokyo (JP)

(72) Inventor: Masaki Kobayashi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/153,141

(22) Filed: Jan. 20, 2021

(65) Prior Publication Data

US 2021/0223733 A1     Jul. 22, 2021

(30) Foreign Application Priority Data

Jan. 21, 2020 (JP) .............................. JP2020-007835
Jan. 6, 2021 (JP) .............................. JP2021-001046

(51) Int. Cl.
  *G03G 15/00*  (2006.01)
  *G06F 3/12*   (2006.01)

(52) U.S. Cl.
  CPC ....... *G03G 15/5029* (2013.01); *G06F 3/1256* (2013.01); *G06F 3/1273* (2013.01)

(58) Field of Classification Search
  CPC .................................................. G03G 15/5029
  See application file for complete search history.

(56) References Cited

U.S. PATENT DOCUMENTS 6,668,144 B2   12/2003   Maruyama

FOREIGN PATENT DOCUMENTS

| JP | 2002-182518 A |   | 6/2002 |
|----|---------------|---|--------|
| JP | 2005-345927 A |   | 12/2005 |
| JP | 2006-175611 A |   | 7/2006 |
| JP | 2007-093896 A |   | 4/2007 |
| JP | 2007093896 A  | * | 4/2007 |
| JP | 2018-005083 A |   | 1/2018 |

OTHER PUBLICATIONS

JP_2007093896_A MachineTranslation, Japan, 2007, Ogawa.*

* cited by examiner

*Primary Examiner* — Victor Verbitsky
(74) *Attorney, Agent, or Firm* — Venable LLP

(57) ABSTRACT

In an image forming apparatus, a detecting unit is configured to detect a characteristic value indicating a characteristic of a recording material fed from a sheet feeding unit. A determination unit is configured to determine a type of the recording material, based on the detected characteristic value and a determination rule for determining a type of a recording material. A control unit is configured to control an image forming condition for performing image formation onto the recording material in accordance with the determined type of the recording material. A collection unit is configured to collect an operation history of the image forming apparatus. An adjustment unit is configured to adjust the determination rule used by the determination unit based on the collected operation history.

14 Claims, 14 Drawing Sheets

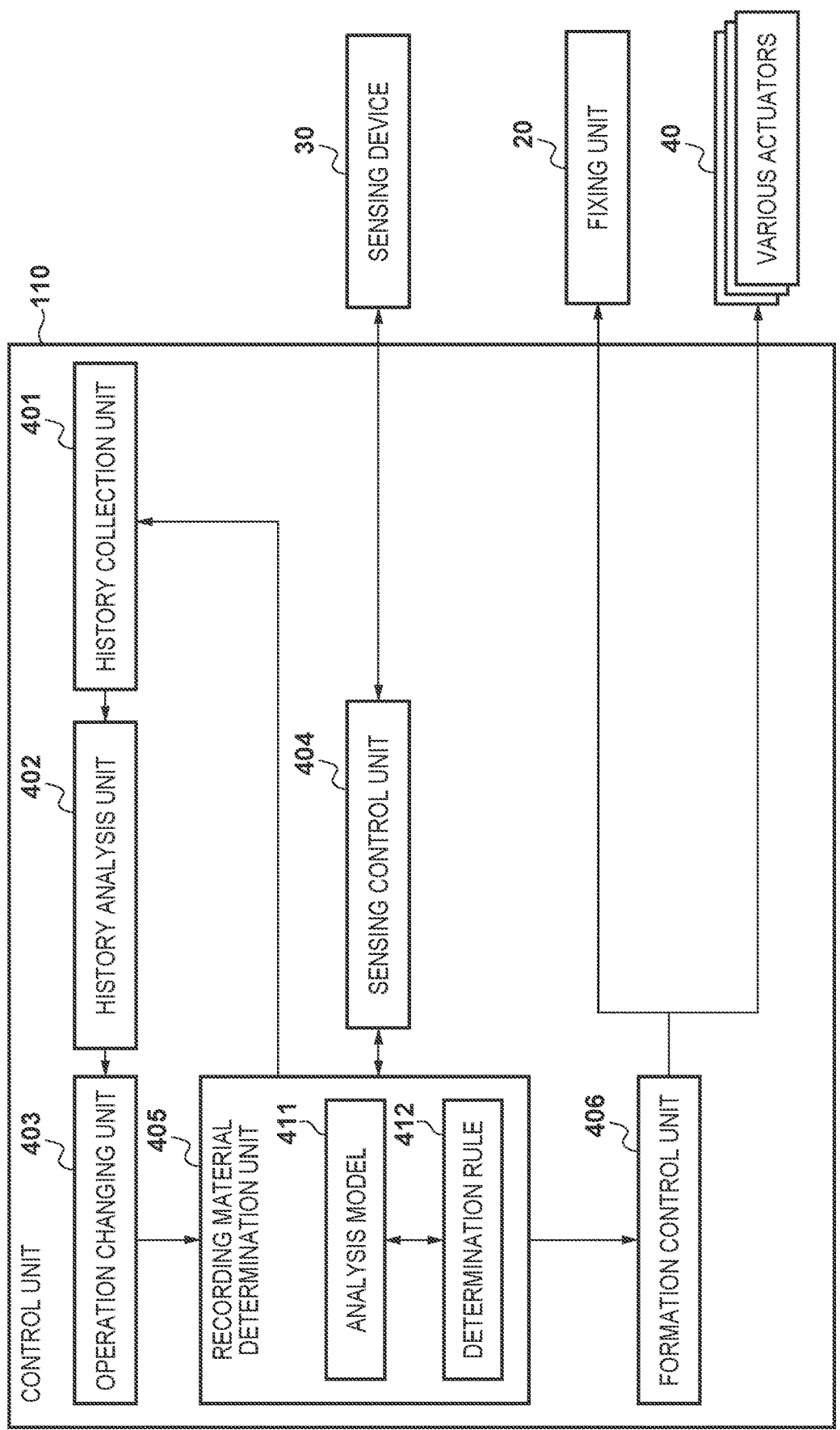

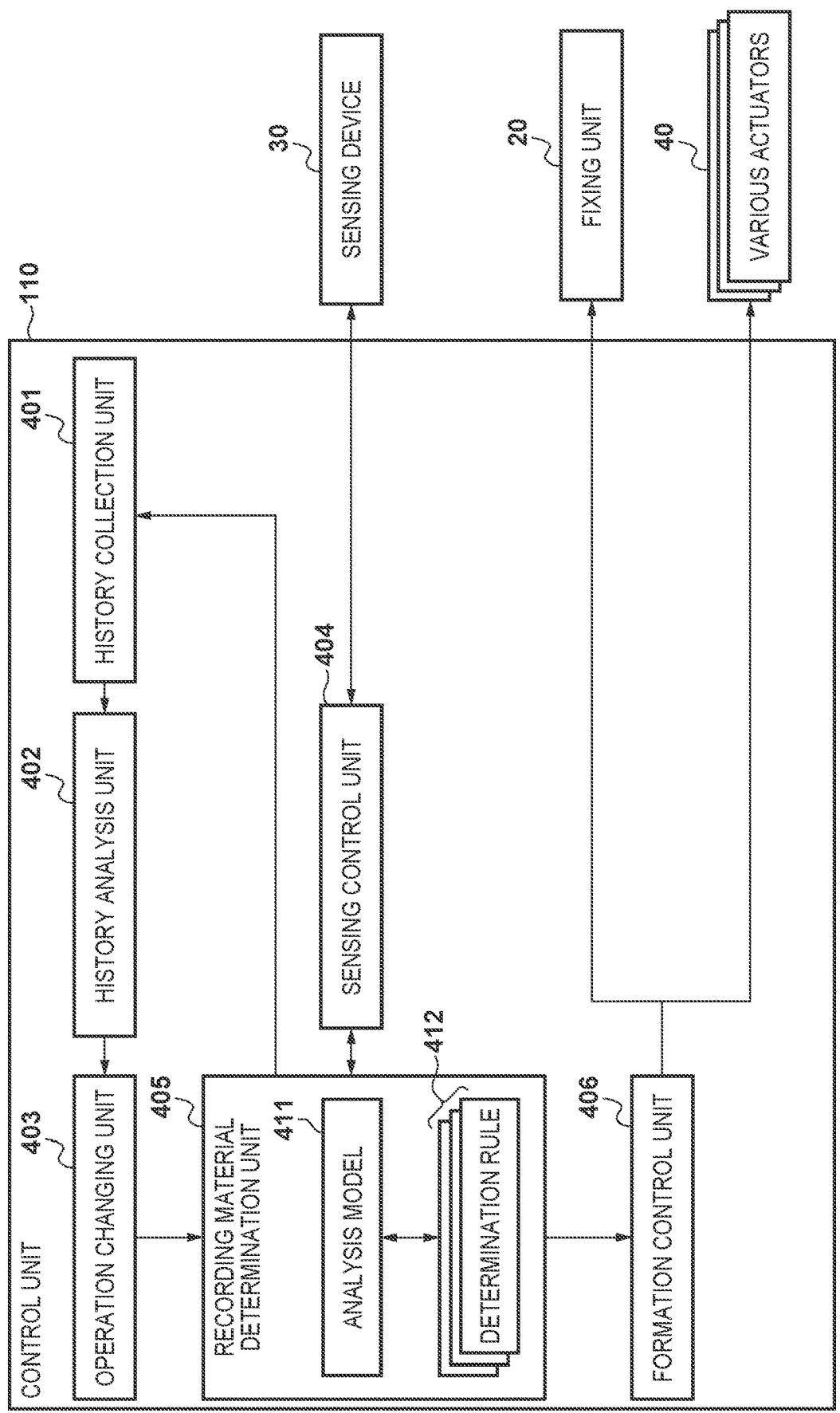

FIG. 11

[CONFIRMATION WITH CUSTOMER]

IS PRINT QUALITY OKAY?

- YES
- NO

YOUR RESPONSE WILL BE USED IN IMPROVING RELIABILITY OF PRINTER OPERATION.

FIG. 12A

PRINTER OPERATION HISTORY

| TIME | USER | SUPPLY UNIT | SHEET TYPE(S) TO BE CANDIDATE(S) |
|---|---|---|---|
| 2018/6/8 10:10:15 | A | SHEET FEEDING UNIT 1 | SHEET TYPE 1 |
| 2018/6/8 10:10:20 | B | SHEET FEEDING UNIT 2 | SHEET TYPE 1, SHEET TYPE 2 |
| 2018/6/8 10:10:25 | B | SHEET FEEDING UNIT 2 | SHEET TYPE 2 |
| ... | ... | ... | ... |
| 2018/6/8 11:30:50 | C | SHEET FEEDING UNIT 1 | SHEET TYPE 5 |

FIG. 12B

RESULT OF ANALYZING OPERATION HISTORY

| SHEET TYPE(S) TO BE CANDIDATE(S) | NUMBER OF SHEETS |
|---|---|
| SHEET TYPE 1 | 820 |
| SHEET TYPE 2 | 95 |
| SHEET TYPE 3 | 100 |
| SHEET TYPE 4 | 0 |
| SHEET TYPE 5 | 25 |
| TOTAL | 1040 |

FIG. 12C

RESULT OF ANALYZING OPERATION HISTORY

| SHEET TYPE(S) TO BE CANDIDATE(S) | NUMBER OF SHEETS | | |
|---|---|---|---|
| | SHEET FEEDING UNIT 1 | SHEET FEEDING UNIT 2 | TOTAL |
| SHEET TYPE 1 | 105 | 715 | 820 |
| SHEET TYPE 2 | 95 | 0 | 95 |
| SHEET TYPE 3 | 100 | 0 | 100 |
| SHEET TYPE 4 | 0 | 0 | 0 |
| SHEET TYPE 5 | 0 | 25 | 25 |
| TOTAL | 300 | 740 | 1040 |

FIG. 12D

RESULT OF ANALYZING OPERATION HISTORY

| SHEET TYPE(S) TO BE CANDIDATE(S) | NUMBER OF SHEETS | | | |
|---|---|---|---|---|
| | USER A | USER B | USER C | TOTAL |
| SHEET TYPE 1 | 0 | 800 | 20 | 820 |
| SHEET TYPE 2 | 95 | 0 | 0 | 95 |
| SHEET TYPE 3 | 34 | 33 | 33 | 100 |
| SHEET TYPE 4 | 0 | 0 | 0 | 0 |
| SHEET TYPE 5 | 25 | 0 | 0 | 25 |
| TOTAL | 154 | 833 | 53 | 1040 |

IMAGE FORMING APPARATUS FOR CONTROLLING IMAGE FORMING CONDITION BASED ON RECORDING MATERIAL TYPE

BACKGROUND OF THE INVENTION

Field of the Invention

The present invention relates to an image forming apparatus for performing image formation by determining a type of a recording material.

Description of the Related Art

In image forming apparatuses of an electrophotographic type, an inkjet type, and the like, image forming conditions may be controlled in accordance with a type of a recording material for image formation. In such a case, in order to form higher-quality images, it is necessary to accurately determine a type of a recording material.

Japanese Patent Laid-Open No. 2002-182518 discloses an image forming apparatus that detects a state of a surface of a recording material based on image data which was obtained by reading with a reading sensor the surface of the recording material, and sets a fixing processing condition in accordance with the detection result thereof. Also, Japanese Patent Laid-Open No. 2018-005083 discloses an image forming apparatus that senses a characteristic value of a recording material, and in a case where the sensed characteristic value is within a range of characteristic values corresponding to a type of a recording material designated by a user, uses an image forming condition that is associated with that range. In such a case, accuracy in determining a recording material is improved by updating the range of characteristic values for determining a type of a recording material.

However, the same sensing result may be obtained even with different types of recording materials due to, for example, variabilities in characteristics of sensors that are used for sensing a characteristic value of a recording material and in characteristics of recording materials that occur during manufacturing of the recording materials. In such a case, it may be difficult to accurately determine a type of a recording material based on a sensed characteristic value. As a result, images cannot be formed using an image forming condition (for example, a fixing condition and a transfer condition) that is compatible with a type of a recording material, and image formation quality may decrease.

SUMMARY OF THE INVENTION

The present invention has been made in view of the aforementioned problems and provides a technique for increasing accuracy in determining a type of a recording material and forming a higher-quality image.

According to one aspect of the present invention, there is provided an image forming apparatus comprising: a detecting unit configured to detect a characteristic value indicating a characteristic of a recording material fed from a sheet feeding unit; a determination unit configured to determine a type of a recording material based on the characteristic value detected by the detecting unit and a determination rule for determining a type of a recording material; a control unit configured to control an image forming condition for performing the image formation onto the recording material in accordance with the type of the recording material determined by the determination unit; a collection unit configured to collect an operation history of the image forming apparatus; and an adjustment unit configured to adjust the determination rule used by the determination unit based on the operation history collected by the collection unit.

Further features of the present invention will become apparent from the following description of exemplary embodiments (with reference to the attached drawings).

BRIEF DESCRIPTION OF THE DRAWINGS

FIG. 4 is a block diagram illustrating an example of a functional configuration of a control unit.

FIG. 7 is a block diagram illustrating an example of a functional configuration of a control unit (second and third embodiments).

FIG. 11 illustrates an example of a confirmation screen displayed on an operation display unit (fourth embodiment).

FIG. 12A illustrates an example of an operation history of the printer.

FIGS. 12B to 12D illustrate examples of results of analyzing an operation history of the printer.

DESCRIPTION OF THE EMBODIMENTS

Figure 1:
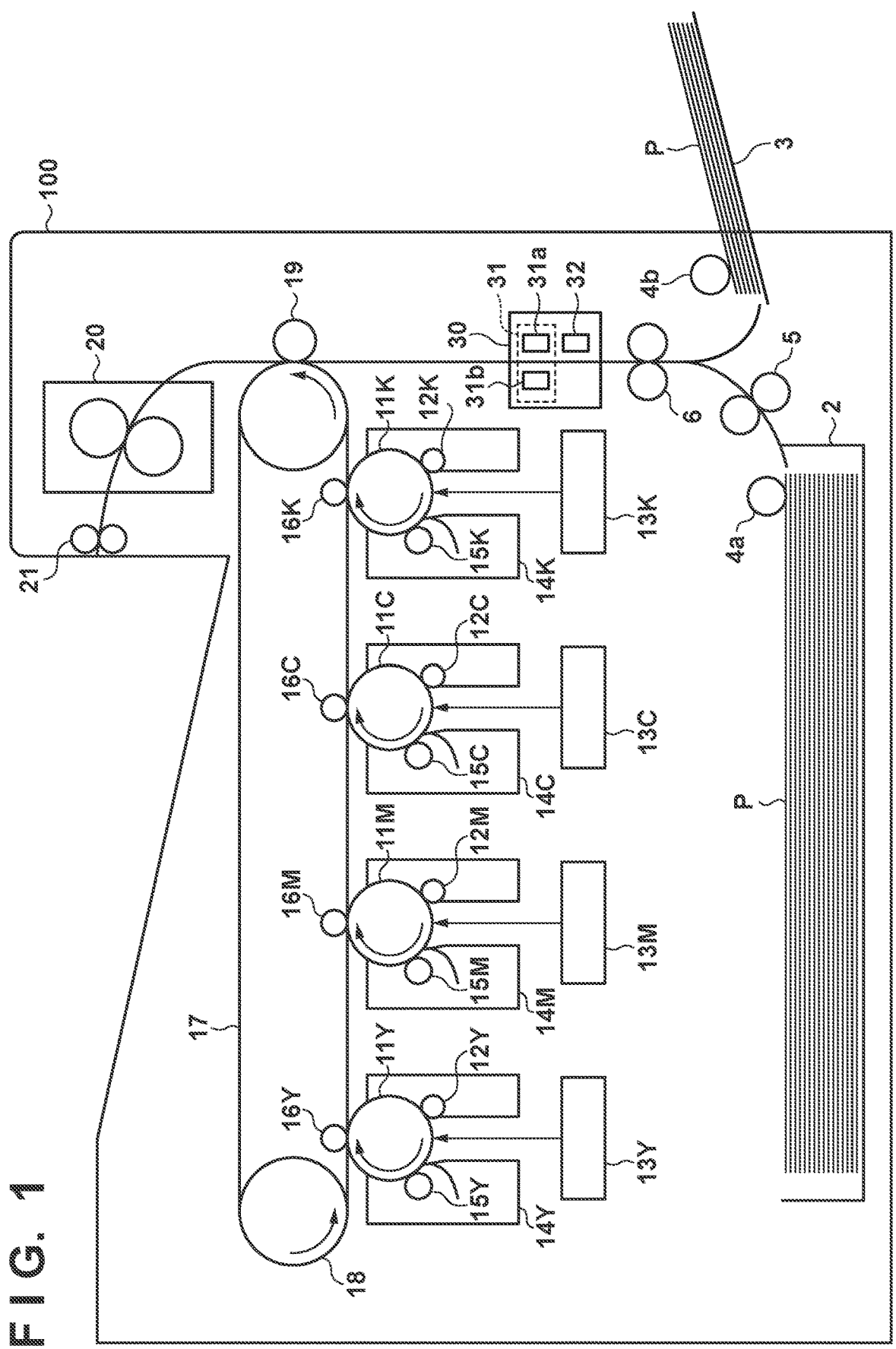
FIG. 1 is a cross-sectional view illustrating a schematic example of a configuration of an image forming apparatus (printer).

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Image Forming Apparatus>

FIG. 1 is a cross-sectional view illustrating a schematic example of a configuration of an image forming apparatus according to first to fourth embodiments. A printer 100 illustrated in FIG. 1 is an image forming apparatus of an electrophotographic type and is configured as a tandem color laser printer including an intermediate transfer belt and a plurality of image forming units that are positioned in parallel. Note that the image forming apparatus may be configured as a copying machine, a multi-function peripheral (MFP), or a facsimile apparatus, for example.

The printer 100 includes image forming units for forming images using yellow (Y), magenta (M), cyan (C), and black (K) developing agents. Note that in the attached drawings and the description below, Y, M, C, and K at the end of reference numerals indicate that the colors of the developing agents (toner) that the corresponding parts are used for are yellow, magenta, cyan, and black, respectively. In the following description, in a case where there is no need to distinguish colors, reference numerals omitting Y, M, C, and K at the end will be used. For example, in a case where a photosensitive drum 11 is denoted, each of photosensitive drums 11Y, 11M, 11C, and 11K is indicated.

The photosensitive drum 11 (photoconductive body) is an image carrier that carries a developing agent (toner) of a corresponding color. A charging roller 12 uniformly charges to a predetermined potential a surface of the photosensitive drum 11. An optical unit 13 forms an electrostatic latent image on the photosensitive drum 11 by emitting onto the charged photosensitive drum 11 a laser beam based on image data (image signal) of a corresponding color. A process cartridge 14 includes a developing roller 15. The developing roller 15 forms a toner image on the photosensitive drum 11 by feeding to the photosensitive drum 11 toner stored within the process cartridge 14 and then visualizing using the toner thereof the electrostatic latent image that was formed on the photosensitive drum 11.

A primary transfer roller 16 transfers (primary transfer) onto an intermediate transfer belt 17 an image (toner image) that is formed on the photosensitive drum 11. The intermediate transfer belt 17 is an intermediate transfer member that carries an image transferred from each photosensitive drum 11. The intermediate transfer belt 17 is driven by a driving roller 18.

A secondary transfer roller 19 transfers (secondary transfer) onto a recording material P that is conveyed through a conveyance path from a sheet feeding cassette 2 an image that is formed on the intermediate transfer belt 17. A fixing unit 20, by applying heat and pressure to an image (toner image) on the recording material P that is conveyed through the conveyance path, fixes that image onto the recording material P. A discharge roller pair 21 discharges onto a sheet discharging tray the recording material P on which fixing processing was performed by the fixing unit 20.

The printer 100 includes the sheet feeding cassette 2 (sheet feeding unit 1) and a sheet feeding tray 3 (sheet feeding unit 2) as sheet feeding units for feeding recording materials P to be used for image formation. The sheet feeding cassette 2 stores recording materials P to be used in image formation. A sheet feeding roller 4a feeds to the conveyance path a recording material P from the sheet feeding cassette 2 by being driven to rotate by a motor (not shown). The recording material P that is fed into the conveyance path from the sheet feeding cassette 2 is conveyed by a conveyance roller pair 5. Also, on the sheet feeding tray 3, recording materials P to be used for image formation are stacked. A sheet feeding roller 4b feeds to the conveyance path a recording material P from the sheet feeding tray 3 by being driven to rotate by a motor (not shown).

The printer 100 includes a sensing device (detecting device) 30 that senses (detects) a characteristic (characteristic value) of a recording material P. The sensing device 30 is positioned on the conveyance path of recording materials P. In the present embodiment, the sensing device 30 is placed at a position between a registration roller pair 6 and the secondary transfer roller 19 on the conveyance path. The sensing device 30 senses a characteristic (characteristic value) of a recording material that is fed from the sheet feeding cassette 2 or the sheet feeding tray 3 and then is conveyed through the conveyance path.

Figure 2:
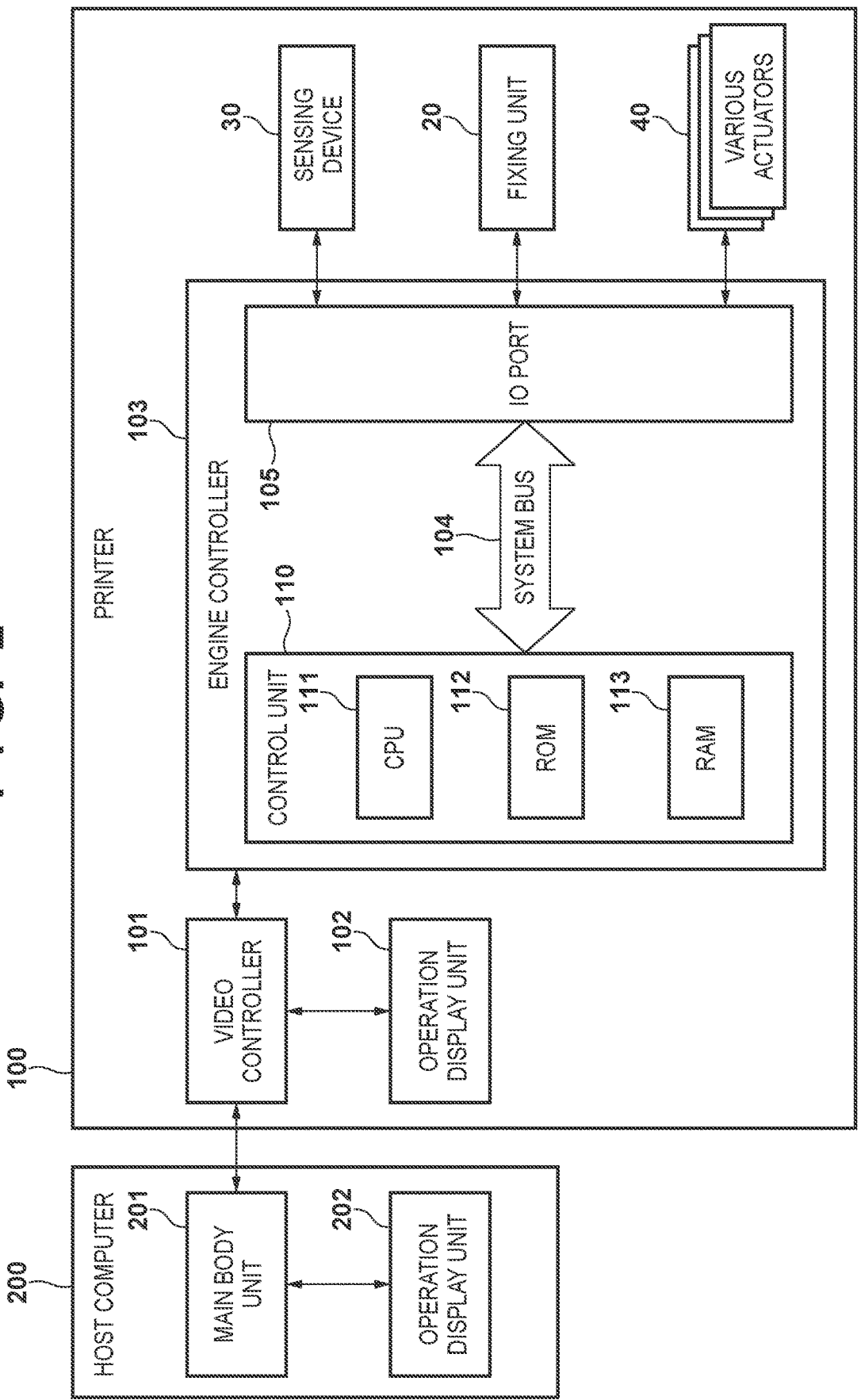
FIG. 2 is a block diagram illustrating an example of a hardware configuration related to printer control.

The printer 100 of the present embodiment includes a determination function for determining (identifying) a type of a recording material P based on a characteristic value of a recording material P sensed (detected) by the sensing device 30. As described later, the determination function is provided in a control unit 110 (FIG. 2). As characteristic values for characterizing a type of a recording material P, there are grammages and surface properties, for example. The sensing device 30 includes a grammage sensor 31 for sensing (detecting) a grammage of a recording material P and a surface property sensor 32 for sensing (detecting) a surface property of a recording material P. The grammage sensor 31 includes a transmitter 31a for transmitting ultrasonic waves and a receiver 31b for receiving ultrasonic waves.

<Image Forming Operation>

The printer 100 is provided with the control unit 110 which includes a CPU 111 (FIG. 2). The control unit 110 comprehensively controls an image forming operation of the printer 100. When print data including, for example, a print instruction and image information (image data) is inputted from an external apparatus such as a host computer 200 (FIG. 2), the control unit 110 controls each device within the printer 100 to start an image forming operation (print operation).

First, the control unit 110 starts feeding a recording material P by controlling mechanisms for feeding and conveying a recording material P. The recording material P is fed onto the conveyance path by being fed from the sheet feeding cassette 2 by the sheet feeding roller 4a or by being fed from the sheet feeding tray 3 by the sheet feeding roller 4b. The recording material P that is fed onto the conveyance path temporarily stops in a state in which it is sandwiched by the registration roller pair 6.

The control unit 110 controls timings for feeding and conveying a recording material P in synchronization with a timing of an image forming operation for forming an image on the intermediate transfer belt 17. Specifically, conveyance of a recording material P waiting at a position of the registration roller pair 6 is resumed in accordance with a timing when an image that is formed on the intermediate transfer belt 17 reaches a secondary transfer position (between the intermediate transfer belt 17 and the secondary transfer roller 19).

The control unit 110 controls each device so as to execute the following sequence of an image forming operation, in synchronization with an operation for feeding and conveying a recording material P as described above. First, the charging roller 12 charges to a predetermined potential a surface of the photosensitive drum 11. The optical unit 13 forms an electrostatic latent image on the photosensitive drum 11 by exposing the charged photosensitive drum 11 with a laser beam corresponding to image data included in the inputted print data.

Then, the developing roller 15 forms a toner image on the photosensitive drum 11 by using toner of a corresponding color to develop the electrostatic latent image that is formed on the photosensitive drum 11. The photosensitive drum 11 is in contact with the intermediate transfer belt 17 and rotates in synchronization with rotation of the intermediate transfer belt 17. By this, the toner image that is formed on the photosensitive drum 11 moves to a primary transfer position (between the intermediate transfer belt 17 and the photosensitive drum 11).

The primary transfer rollers 16Y, 16M, 16C, and 16K transfer onto the intermediate transfer belt 17 the toner image of each color formed on the photosensitive drums 11Y, 11M, 11C, and 11K, respectively, such that they are overlapped on one another in order. By this, a color image which is a toner image of Y, M, C, and K toner is formed on the intermediate transfer belt 17.

The color image that is formed on the intermediate transfer belt 17 moves to a secondary transfer position in accordance with rotation of the intermediate transfer belt 17 and then is transferred onto a recording material P by the secondary transfer roller 19. The color image that is transferred onto a recording material P is fixed onto the recording material by the fixing unit 20 applying heat and pressure. The recording material P on which fixing processing was performed by the fixing unit 20 is discharged onto a sheet discharging tray by the discharge roller pair 21. Thus, the image forming operation in regards to a single sheet of a recording material P is ended.

<Control Configuration>

FIG. 2 is a block diagram illustrating an example of a hardware configuration related to control of the printer 100 of the present embodiment. The printer 100 is connected with the host computer 200 via a network such as a LAN so as to be able to communicate with the host computer 200. The host computer 200 can transmit print data and print instructions to the printer 100 via a network. The host computer 200 includes a main body unit 201 and an operation display unit 202. The operation display unit 202 includes a display (display unit) and an operation unit (input device) such as a keyboard and a mouse, which are not shown in FIG. 2.

The printer 100 includes a video controller 101, an operation display unit 102, and an engine controller 103. The operation display unit 102 includes an operation unit (input device) such as an operation panel and operation buttons, which are not shown in FIG. 2. The video controller 101 outputs to the engine controller 103 the print data and print instructions received from the host computer 200.

The engine controller 103 includes: the control unit 110 including the CPU 111, a ROM 112, and a RAM 113; a system bus 104; and an IO port 105. The CPU 111 loads programs that are stored in the ROM 112 to the RAM 113 and executes them. A storage region of the RAM 113 is used as a working area of the CPU 111. The CPU 111 can access the IO port 105 via the system bus 104. Various devices within the printer 100 such as the fixing unit 20, the sensing device 30, and various actuators 40 for realizing conveyance of recording materials and image formation are connected to the IO port 105. The CPU 111 controls each device that can be connected to via the IO port 105.

<Sensing Device>

Figure 3A:
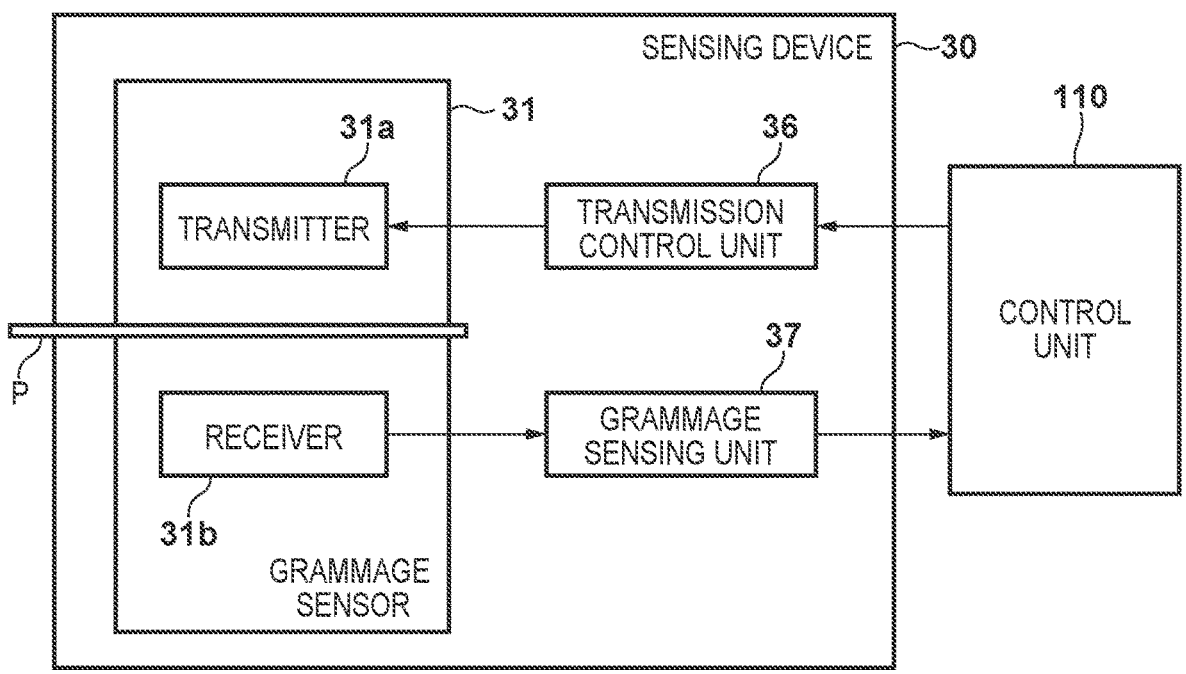
FIGS. 3A and 3B are block diagrams illustrating examples of a configuration of a sensing device.
Figure 3B:
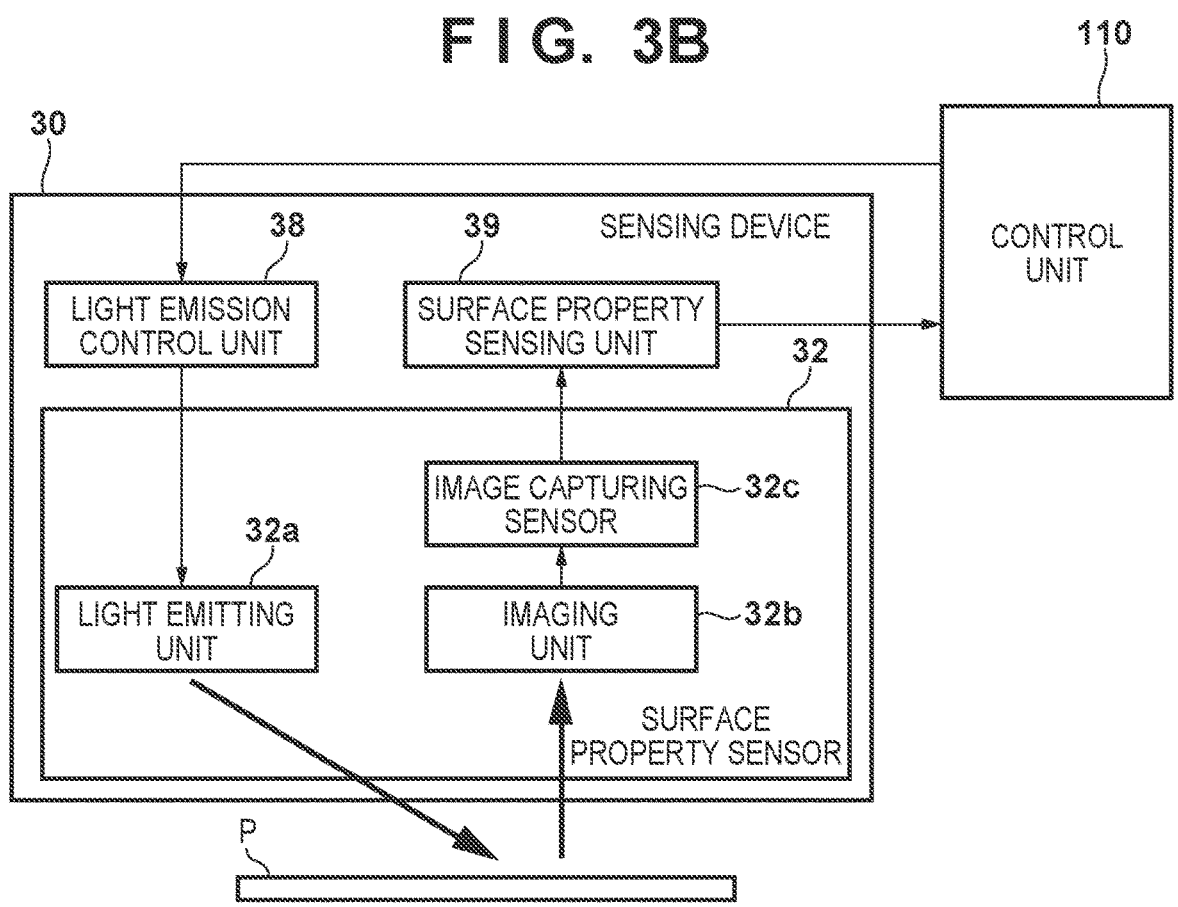

FIGS. 3A and 3B are block diagrams illustrating examples of a configuration of the sensing device 30. FIG. 3A illustrates a configuration that is related to sensing of a grammage of a recording material P, and FIG. 3B illustrates a configuration that is related to sensing of a surface property of a recording material P. Note that, as described above, the sensing device 30 includes the grammage sensor 31 and the surface property sensor 32. The sensing device 30 senses characteristic values indicating characteristics of a recording material P that is fed from a sheet feeding unit (sheet feeding cassette 2 or sheet feeding tray 3). In the present embodiment, the sensing device 30 senses, as characteristic values, values indicating a grammage of a recording material P and a surface property of a recording material P. The sensing device 30 performs the following operation based on an instruction from the control unit 110.

FIG. 3A illustrates the grammage sensor 31. When the control unit 110 instructs to transmit an ultrasonic wave, a transmission control unit 36 generates a driving signal and supplies it to the transmitter 31a. The transmitter 31a transmits an ultrasonic wave by vibrating a vibration plate in accordance with the driving signal. When passing through a recording material P, the ultrasonic wave attenuates in accordance with a grammage of the recording material. The receiver 31b outputs a sensing signal in accordance with the received ultrasonic wave. For example, in a case where a recording material P is of a small grammage (thin paper), attenuation is small, and therefore, a peak value of the sensing signal that is outputted by the receiver 31b will be large. To the contrary, in a case where a recording material P is of a large grammage (thick paper), attenuation is large, and therefore, a peak value of the sensing signal that is outputted by the receiver 31b will be small.

A grammage sensing unit 37 calculates a grammage of a recording material P based on an attenuation factor of a peak value of a sensing signal that is outputted by the receiver 31b, and then outputs the result to the control unit 110. The attenuation factor is obtained as a ratio of a peak value Pa which was acquired in a state in which a recording material P is not present between the transmitter 31a and the receiver 31b, to a peak value Pb which was acquired in a state in which a recording material P was present between the transmitter 31a and the receiver 31b. The control unit 110 acquires the peak value Pa by causing the transmitter 31a to transmit an ultrasonic wave in a state in which a recording material P is not present between the transmitter 31a and the receiver 31b and causing the receiver 31b to receive the ultrasonic wave and output a sensing signal. Acquisition of the peak value Pa may be executed immediately prior to a recording material P reaching the grammage sensor 31. By this, measurement environments of the peak values Pa and Pb will be approximately the same, and therefore improvement of accuracy in measuring the peak values Pa and Pb can be expected.

FIG. 3B illustrates the surface property sensor 32. The surface property sensor 32 includes a light emitting unit 32a such as a light emitting diode, an imaging unit 32b such as an imaging lens, and an image capturing sensor 32c such as a CCD sensor or a CMOS sensor. The light emitting unit 32a irradiates light onto a surface of a recording material P. The imaging unit 32b forms an image, onto an image capturing plane of the image capturing sensor 32c, of light emitted from the light emitting unit 32a and then reflected by a surface of a recording material P. The image capturing sensor 32c captures light that is imaged by the imaging unit 32b.

The control unit 110 instructs a light emission control unit 38 to emit light from the light emitting unit 32a when a recording material P is conveyed to a set position of the surface property sensor 32. The light emission control unit 38 supplies a driving current to the light emitting unit 32a in accordance with an instruction to emit light. The light emitting unit 32a emits light based on a driving current to irradiate light onto a surface of a recording material P. The light irradiated onto the recording material P is imaged by the image capturing sensor 32c via the imaging unit 32b. An image signal that is outputted by the image capturing sensor 32c is an image signal indicating a surface image of a recording material P and is outputted to a surface property sensing unit 39.

The surface image that is indicated by an image signal inputted into the surface property sensing unit 39 changes depending on a surface property (unevenness) of a recording material P. For example, a surface image of a highly uneven recording material P (whose surface property is rough) such as those typically referred to as rough paper will have a surface image with a high shadow ratio. Meanwhile, a surface image of a recording material P whose surface is relatively smooth such as those referred to as coated paper will have a surface image with less shadow. The surface property sensing unit 39 calculates a characteristic value of a surface property of a recording material P from a ratio of shadow in the surface image, and outputs the result to the control unit 110.

Here, an electrical resistance value of a recording material P whose surface property is smooth is relatively low, and an electrical resistance value of a recording material P whose surface property is rough is relatively high. Therefore, a transfer current that is necessary for a recording material P whose surface property is smooth is large, and a transfer current that is necessary for a recording material P whose surface property is rough is small. The control unit 110 may adjust transfer currents or transfer voltages to be applied to the primary transfer roller 16 and the secondary transfer roller 19 in accordance with a sensing result, obtained by the surface property sensor 32 (surface property sensing unit 39), of a surface property of a recording material P. Accordingly, it becomes possible to efficiently transfer a toner image and improve reproducibility of a toner image density.

<Control Unit>

FIG. 4 is a block diagram illustrating an example of a functional configuration of the control unit 110. Each functional unit indicated by a block in FIG. 4 is realized by the CPU 111 based on programs stored in the ROM 112 and data stored in the RAM 113. Functions included in the control unit 110 are classified into functions that are related to an operation history of the printer 100, functions that are related to determination of a type of a recording material, and functions that are related to image formation. Each function will be described in order in the following.

The control unit 110 includes a history collection unit 401, a history analysis unit 402, and an operation changing unit 403 as functions that are related to an operation history of the printer 100. The history collection unit 401 collects and stores (saves) in the RAM 113 an operation history of the printer 100. The history analysis unit 402 analyzes the operation history collected by the history collection unit 401. Specifically, the history analysis unit 402, from the collected operation history, extracts and processes information that could be a base for changing a printer operation and then stores, as an analysis result in the RAM 113, the obtained information. Note that details of the operation history of the printer 100 and the analysis thereof will be described later.

The operation changing unit 403 adjusts (changes) a determination rule 412 to be used by a recording material determination unit 405 based on the operation history collected by the history collection unit 401. More specifically, the operation changing unit 403 adjusts the determination rule 412 based on a result of analyzing an operation history by the history analysis unit 402.

The control unit 110 further includes a sensing control unit 404 and the recording material determination unit 405 as functions that are related to determination of a type of a recording material. The sensing control unit 404, by controlling the sensing device 30, acquires characteristic values that indicate characteristics of a recording material P and provides the recording material determination unit 405 with the acquired characteristic values. The recording material determination unit 405 includes an analysis model 411 for analyzing characteristics of a recording material and the determination rule 412 for determining a type of the recording material based on characteristic values of the recording material. The analysis model 411 is a model for evaluating the relationship between characteristic values of a recording material P and a type of a recording material P.

In the present embodiment, a model in which a possible range of characteristic values is defined for each type of a recording material (sheet type) in a real coordinate space (characteristic value space) that is expressed in one or more characteristic values is used as the analysis model 411. Also, the determination rule 412 defines a reference for associating a characteristic value of a recording material P with one of a plurality of predefined sheet types. In the present embodiment, the determination rule 412 corresponds to a boundary (determination boundary) for determining (identifying) a single sheet type based on a characteristic value in the characteristic value space. For example, the determination rule 412 defines a boundary between a range of characteristic values for which a type of a recording material is determined to be a first type, and a range of characteristic values for which a type of a recording material is determined to be a second type. The recording material determination unit 405 determines a type of a recording material P based on such determination rule 412 and characteristic values sensed by the sensing device 30.

Figure 5A:
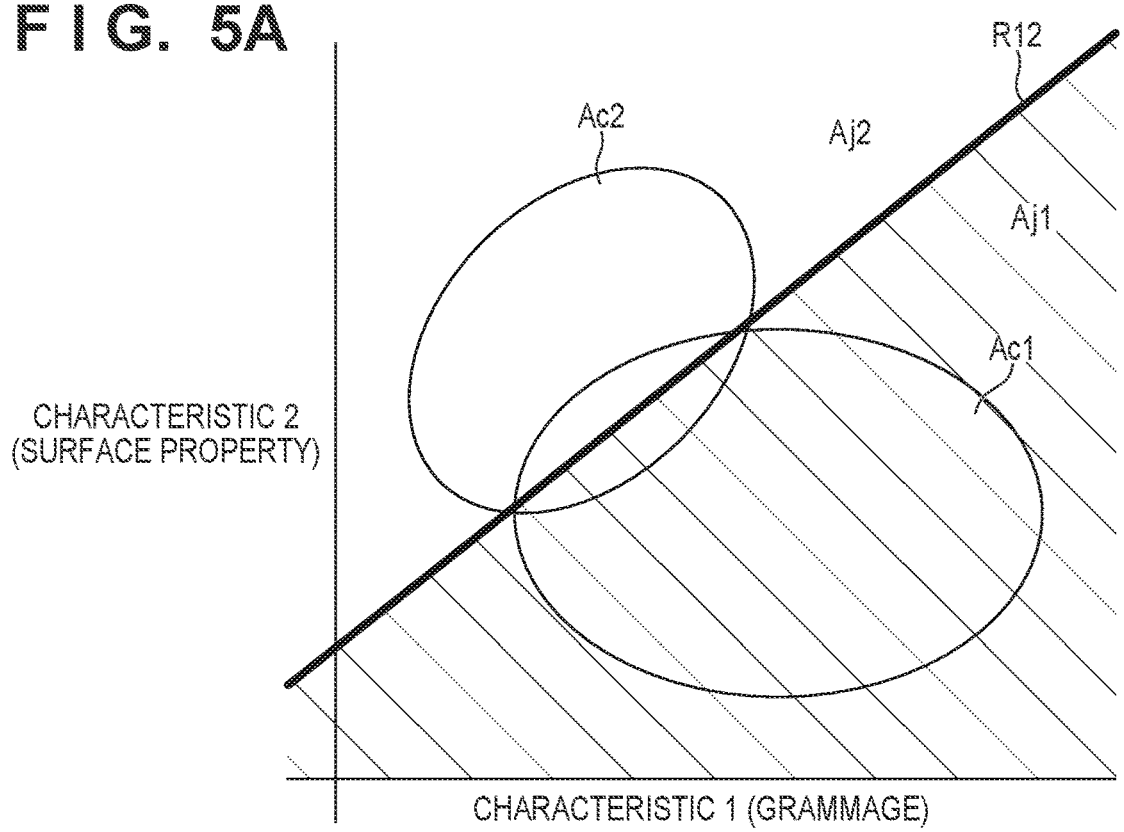
FIG. 5A illustrates concrete examples of an analysis model and a determination rule.

FIG. 5A illustrates a concrete example of the analysis model 411 and the determination rule 412 in the present embodiment. Here, for the sake of descriptive convenience, a case of discriminating between two types (sheet types 1 and 2) are determined with regards to a type of a recording material is assumed. In an example in FIG. 5A, the analysis model 411 defines a possible range Ac1 of characteristic values for the sheet type 1 and a possible range Ac2 of characteristic values for the sheet type 2 in a two-dimensional real coordinate space that is expressed by two characteristic values (grammage and surface property). Possible ranges (characteristic value ranges) of respective characteristic values for a plurality of sheet types may overlap. In a case where characteristic values within such overlapping ranges are sensed, it means that there are a plurality of candidates for sheet types (candidate sheet types) to be determined based on these characteristic values.

In the example in FIG. 5A, a determination boundary R12 between the sheet type 1 and the sheet type 2 is indicated as the determination rule 412 for determining (identifying) a single sheet type based on characteristic values in a two-dimensional real coordinate space (characteristic value space). The determination boundary R12 defines a boundary between a range Aj1 for which a type of a recording material is determined to be the sheet type 1 (first type), and a range Aj2 for which a type of a recording material is determined to be the sheet type 2 (second type) based on the sensed characteristic values.

The recording material determination unit 405 applies the analysis model 411 to a characteristic value of a recording material P that is acquired by the sensing control unit 404. By this, the recording material determination unit 405 can obtain candidate sheet types based on a characteristic value and using the relationship between the sheet types (sheet types 1 and 2) and the characteristic value ranges (Ac1 and Ac2), which are defined in the analysis model 411 as illustrated in an example in FIG. 5A.

The recording material determination unit 405, by further applying the determination rule 412 to a characteristic value of a recording material that is acquired by the sensing control unit 404, determines a type of the recording material P from among the candidate sheet types. Specifically, as described above, in a case where characteristic value ranges that correspond to a plurality of sheet types overlap, a plurality of sheet types are obtained as the candidates. In such a case, when the determination rule 412 is applied to the characteristic value, it becomes possible to uniquely define a result of determining a recording material (in other words, it becomes possible to obtain a single sheet type as the determination result).

The control unit 110 further includes a formation control unit 406 as a function that is related to image formation. The formation control unit 406, in accordance with the type of a recording material P that is determined by the recording material determination unit 405, controls an image forming condition for image formation onto the recording material. Specifically, the formation control unit 406 sets the image forming condition in accordance with the determined type of the recording material P, and controls the image forming unit so that image formation onto the recording material P is performed in accordance with the set image forming condition. The image forming condition includes, for example, at least one of the following:

a fixing temperature for fixing an image onto the recording material P in the fixing unit 20;
 a transfer voltage or transfer current that is supplied to the primary transfer roller 16 and the secondary transfer roller 19; and
 a conveyance speed of the recording material P that is controlled through the various actuators 40 (a rotation speed of motors that drive each of the rollers for feeding and conveying the recording material P).

The formation control unit 406 performs control of the various actuators 40 and the fixing unit 20 using the set image forming conditions. By such control, it becomes possible to perform image formation using the image forming condition that is appropriate for a recording material P used by a user.

<Operation History Collection and Analysis>

FIG. 12A illustrates an example of an operation history of the printer 100 that is collected by the history collection unit 401 in the present embodiment. The history collection unit 401 collects and then saves in the RAM 113 information such as those indicated in FIG. 12A as an operation history of the printer 100 each time image formation (printing) on a recording material is performed. In the present embodiment, execution time, a corresponding user, a sheet feeding unit which is a sheet feeding source of a recording material, and a candidate sheet type that is identified based on a characteristic value sensed by the sensing device 30 are saved as the operation history each time image formation onto a recording material is performed.

FIG. 12B indicates an example of a result of analyzing an operation history by the history analysis unit 402 in the present embodiment. The history analysis unit 402 analyzes the operation history in regards to image formation onto the most recent predetermined number (for example, 1040) of recording materials and then saves the analysis result in the RAM 113. In the example in FIG. 12B, the history analysis unit 402 acquires data indicating a usage frequency of each type of a recording material (each sheet type) as the result of analyzing the operation history.

<Determination Rule Adjustment>

Figure 5B:
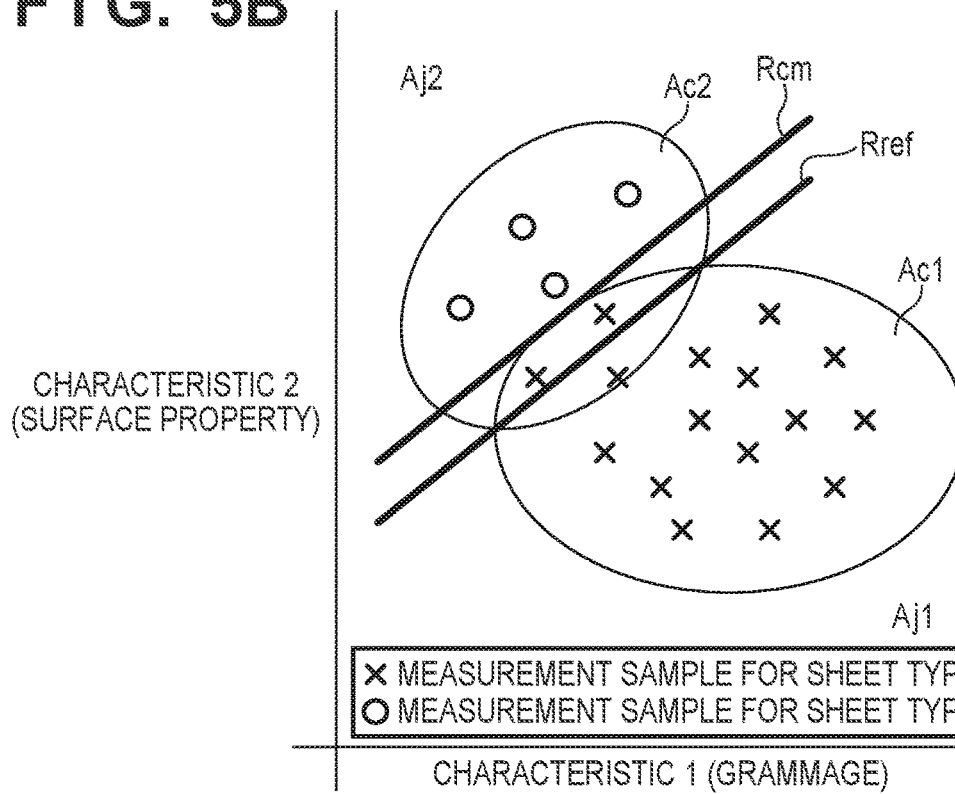
FIG. 5B illustrates an example of adjustment of a determination rule.

FIG. 5B illustrates an example of adjustment of the determination rule (determination boundary R12) for discriminating between two sheet types (sheet type 1 and sheet type 2). In the example in FIG. 5B, similar to the example in FIG. 5A, between the sheet type 1 and the sheet type 2, possible ranges of corresponding characteristic values overlap. In the present embodiment, the operation changing unit 403 adjusts the determination boundary R12 based on an operation history of the printer 100.

First, in a case where there is no sufficient prior knowledge in regards to an operation of the printer 100 (in other words, information that is related to an operation history), an initial determination boundary Rref is set as the determination boundary R12 between the sheet type 1 and the sheet type 2. Rref is a determination boundary that is preset so as to minimize a possibility of erroneous determination of sheet type occurring. For example, in order to minimize a possibility of erroneous determination occurring between the sheet type 1 and the sheet type 2, Rref is defined to bisect a range in which the characteristic value ranges overlap, as illustrated in FIG. 5B.

The recording material determination unit 405, so long as change in the determination rule (determination boundary R12) by the operation changing unit 403 is not performed, uses as the determination rule 412 a predefined initial determination rule (initial determination boundary). The operation changing unit 403 is configured so as to change (adjust) the determination rule (determination boundary R12), that is used by the recording material determination unit 405, based on a result of analyzing the operation history by the history analysis unit 402.

In the present embodiment, an example in which the determination rule adjustment is performed using, as a reference, a sheet type usage frequency that is based on the result of analyzing an operation history of the printer 100 will be described. In other words, the operation changing unit 403 adjusts the determination rule based on the usage frequency of each type of a recording material (type of sheet), that is obtained as the result of analyzing an operation history of the printer 100. Specifically, the operation changing unit 403 adjusts the determination rule so that a sheet type whose usage frequency is relatively high is identified as a result of determining a sheet type with priority over a sheet type whose usage frequency is relatively low. For example, the determination rule is adjusted so that a sheet type (in an example in FIG. 12B, sheet type 1) that is used at a predetermined rate (for example, 80%) or more is preferentially identified as a determination result. By this, it becomes possible to increase accuracy in determining of a sheet type performed based on a characteristic value.

An analysis result indicated in FIG. 12B indicates that a usage frequency of the sheet type 1 is higher in comparison to other sheet types. The operation changing unit 403, in a case where such an analysis result was obtained as a result of analyzing an operation history of the printer 100, changes to Rcm from Rref the determination boundary R12 (determination rule) between the sheet type 1 and the sheet type 2 as illustrated in FIG. 5B. A determination boundary Rcm is defined so as to contact a boundary of the characteristic value range Ac1 of the sheet type 1. As described above, the operation changing unit 403 adjusts the determination boundary R12 so as to broaden the range Aj1 corresponding to a sheet type (sheet type 1) whose usage frequency is higher between the sheet type 1 and the sheet type 2. By such adjustment of the determination boundary R12, in a case where characteristic values within a range in which the characteristic value range Ac1 of the sheet type 1 and the characteristic value range Ac2 of the sheet type 2 overlap are obtained, the sheet type 1 whose usage frequency is higher is identified as the result of determining the sheet type.

As described above, in a case where a plurality of candidate sheet types are identified based on characteristic values, a sheet type whose usage frequency is higher will be preferentially identified as the determination result, and therefore, it becomes possible to increase accuracy in determining of a sheet type performed based on a characteristic value. As a result, it becomes possible to set, in accordance with the result of determining a sheet type, an image forming condition that is more suitable for a type of sheet to be used, which then makes it possible to form higher-quality images.

Note that the determination rule adjustment may be performed, for example, by preparing in advance N determination rules that are different from each other and selecting a determination rule to use as the determination rule 412 from the N determination rules.

<Processing Procedure>

Next, a processing procedure to be executed by the control unit 110 in the present embodiment will be described with reference to a flowchart in FIG. 6.

When the engine controller 103 receives a print instruction from the video controller 101, the control unit 110, in step S101, causes a sheet feeding operation for feeding a recording material P from a sheet feeding unit (sheet feeding cassette 2 or sheet feeding tray 3) to be started and then causes the recording material P to be conveyed. Next, in step S102, the control unit 110 (sensing control unit 404) controls the sensing device 30 so as to acquire a characteristic value(s) of the recording material P. The sensing device 30 senses (detects) a characteristic value(s) of the recording material P by using the grammage sensor 31 and the surface property sensor 32 and then outputs the sensing result (detection result) to the sensing control unit 404.

Next, in step S103, the control unit 110 (recording material determination unit 405) identifies a sheet type(s) that is to be a candidate(s) in determining a sheet type of the recording material P, by applying the analysis model 411 to the characteristic value(s) obtained in step S102. Further, in step S104, the control unit 110 (recording material determination unit 405) performs determination of a sheet type of the recording material P by applying the determination rule 412 (determination boundary R12) to the characteristic value(s). Specifically, in a case where a plurality of sheet types are identified as candidates by application of the analysis model 411, the control unit 110 determines a sheet type of the target recording material P by applying the determination rule 412. Note that in a case where a single sheet type is identified by applying the analysis model 411 in step S103, the control unit 110 may generate a result of determining a sheet type without applying the determination rule 412.

When determination of the sheet type of the recording material P is completed in steps S103 and S104, next in step S105, the control unit 110 (formation control unit 406) sets an image forming condition in accordance with the determined sheet type. Note that the image forming condition includes, for example, at least one of a fixing temperature, a conveyance speed of the recording material P, and a transfer voltage or a transfer current. Further, in step S106, the control unit 110 controls an image forming operation so that image formation onto the recording material P is performed in accordance with the set image forming condition.

Each time printing (image formation) of a page or predetermined number of pages is performed in step S106, the control unit 110 (history collection unit 401), in step S107, acquires (collects) an operation history that is related to image formation executed in step S106. Then, in step S108, the control unit 110 (history analysis unit 402) determines whether or not the amount (collected amount) of operation history that is collected and stored in the RAM 113 in step S107 is a predetermined amount or more. Here, the predetermined amount is an amount of operation history corresponding to 1000 pages of image formation, for example. The control unit 110, in a case where the amount of collected operation history is the predetermined amount or more, advances the processing to step S109 and in a case where the amount of collected operation history is not the predetermined amount or more, advances the processing to step S111.

In step S109, the control unit 110 (history analysis unit 402) performs analysis of the latest operation history of the printer 100 and then stores the analysis result in the RAM 113. Further, in step S110, the control unit 110 (operation changing unit 403) performs adjustment of the determination rule 412 based on a result of analyzing an operation history of the printer 100. Specifically, in a case where portions of characteristic value ranges between a plurality of sheet types overlap in the analysis model 411, the determination rule 412 is adjusted so as to increase a possibility that a sheet type whose usage frequency is high is identified (or so as to cause preferential identification of that sheet type) based on a characteristic value(s) within the overlapping ranges.

Figure 6:
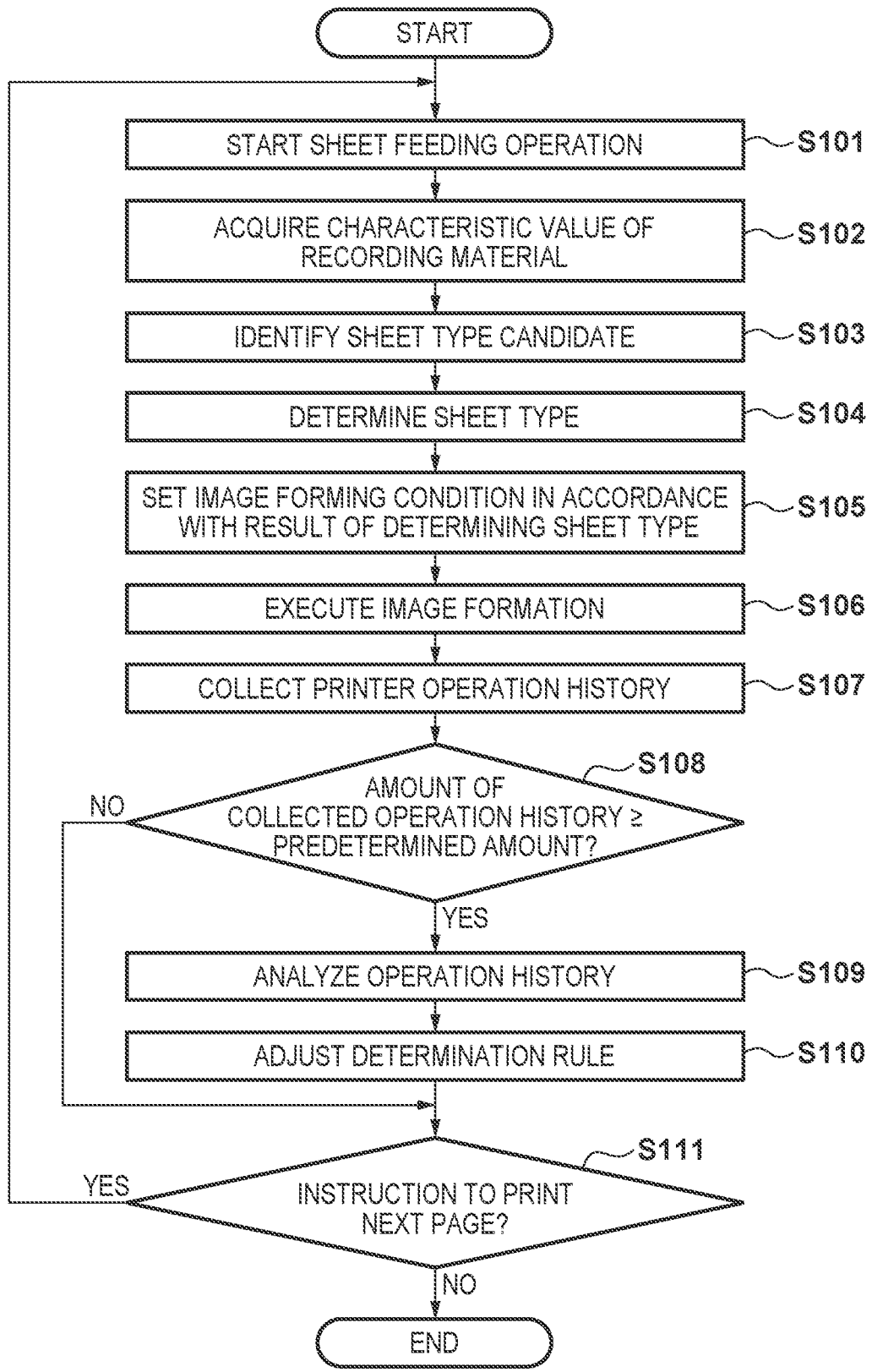
FIG. 6 is a flowchart illustrating a sequence of processing executed by the control unit.

After completion of adjustment of the determination rule 412, the control unit 110, in step S111, determines whether or not a print instruction with regards to printing of the next page is performed, and in a case where the instruction to print the next page is not performed, ends the processing by the procedure in FIG. 6. Meanwhile, the control unit 110, in a case where the instruction to print the next page is performed, returns the processing to step S101. In such a case, the control unit 110 starts a sheet feeding operation of a recording material again (step S101), sets an image forming condition in accordance with a result of determining a sheet type and performs image formation (steps S102 to S106), and then performs adjustment of the determination rule 412 based on a collected operation history (steps S107 to S110).

As described above, in the present embodiment, the sensing device 30 senses (detects) characteristic values indicating characteristics of a recording material P that is fed from a sheet feeding unit. The control unit 110 (recording material determination unit 405) determines a type of the recording material P based on the determination rule 412 for determining a type of the recording material based on the characteristic values of the recording material, and the sensed (detected) characteristic values. The control unit 110 (the formation control unit 406), in accordance with the determined type of the recording material P, controls an image forming condition for image formation onto the recording material P. The control unit 110 (history collection unit 401) collects an operation history of the printer 100. The control unit 110 (operation changing unit 403) adjusts the determination rule 412 used by the recording material determination unit 405 based on the collected operation history.

By virtue of this embodiment, it becomes possible to increase accuracy in determining a type of a recording material. Accordingly, it becomes possible to perform image formation using an image forming condition that is suitable for a recording material that is used by a user, in accordance with a result of determining the type of the recording material (type of sheet). For example, it becomes possible to set a fixing temperature in accordance with the recording material P and accordingly, it becomes possible to reduce excess energy consumption accompanying the fixing processing. Also, by appropriately setting a print mode in accordance with a result of determining the type of the recording material, it becomes possible to improve productivity of the entire system.

Note that the present embodiment is not limited to the above and that various changes may be made. For example, an item or a range in an operation history of the printer 100 to be collected and analyzed may be changed. Also, an amount of movement of the determination boundary may be adjusted in accordance with a ratio of usage frequencies of respective sheet types. Further, the analysis model 411 and the determination rule 412 are not limited to the above and a configuration may be applied in which parameters related to the determination rule may be adjusted in a model that is for analyzing characteristic of a recording material and is based on a method such as a neural network, for example. Also, a plurality of analysis models may be prepared and a configuration may be applied in which the most suitable analysis model is selected using the determination rule.

Second Embodiment

In a second embodiment, an example in which the control unit 110 (operation changing unit 403) performs, separately for each of the sheet feeding units, adjustment of the determination rule 412 based on a result of analyzing an operation history of the printer 100 will be described. In the following, description will be omitted for portions that are the same as the first embodiment and description will be given mainly for portions that are different from the first embodiment.

FIG. 7 is a block diagram illustrating an example of a functional configuration of the control unit 110 in the present embodiment. The present embodiment is different from the first embodiment in that the recording material determination unit 405 within the control unit 110 includes a plurality of determination rules 412 each corresponding to a different sheet feeding unit. In other words, the recording material determination unit 405 includes a determination rule 412 individually for each sheet feeding unit to be a sheet feeding source of a recording material.

As described above, the operation changing unit 403 of the first embodiment changes (adjusts) the determination rule 412, which is to be used by the recording material determination unit 405 and is the same across a plurality of sheet feeding units, based on a result of operation history analysis of the printer 100 by the history analysis unit 402. However, a case in which a type of sheet to be used is different for each sheet feeding unit can be assumed. For example, with respect to the sheet feeding tray 3 (sheet feeding unit 2), because it is a sheet feeding unit in which a user manually sets recording materials for every use, there is a tendency for various types of recording materials to be used. In contrast to this, with respect to the sheet feeding cassette 2 (sheet feeding unit 1), there is a tendency for a specific type of a recording material to be used continuously.

Assuming cases such as those described above, in the present embodiment, the history analysis unit 402 analyzes, for each sheet feeding unit included in the printer 100, an operation history of the printer 100. FIG. 12C indicates an example of a result of analyzing an operation history by the history analysis unit 402 in the present embodiment. The history analysis unit 402 analyzes, for each sheet feeding unit, an operation history in regards to image formation onto the most recent predetermined number (for example, 1040) of recording materials, and then saves the analysis result in the RAM 113. The history analysis unit 402 acquires, separately for each sheet feeding unit, data indicating a usage frequency of each sheet type as a result of analyzing an operation history. In the example in FIG. 12C, data indicating that a usage frequency of the sheet type 1 and a usage frequency of the sheet type 2 are about the same for the sheet feeding unit 1 and that a usage frequency of the sheet type 1 is higher than that of the sheet type 2 for the sheet feeding unit 2 is obtained.

Figure 8A:
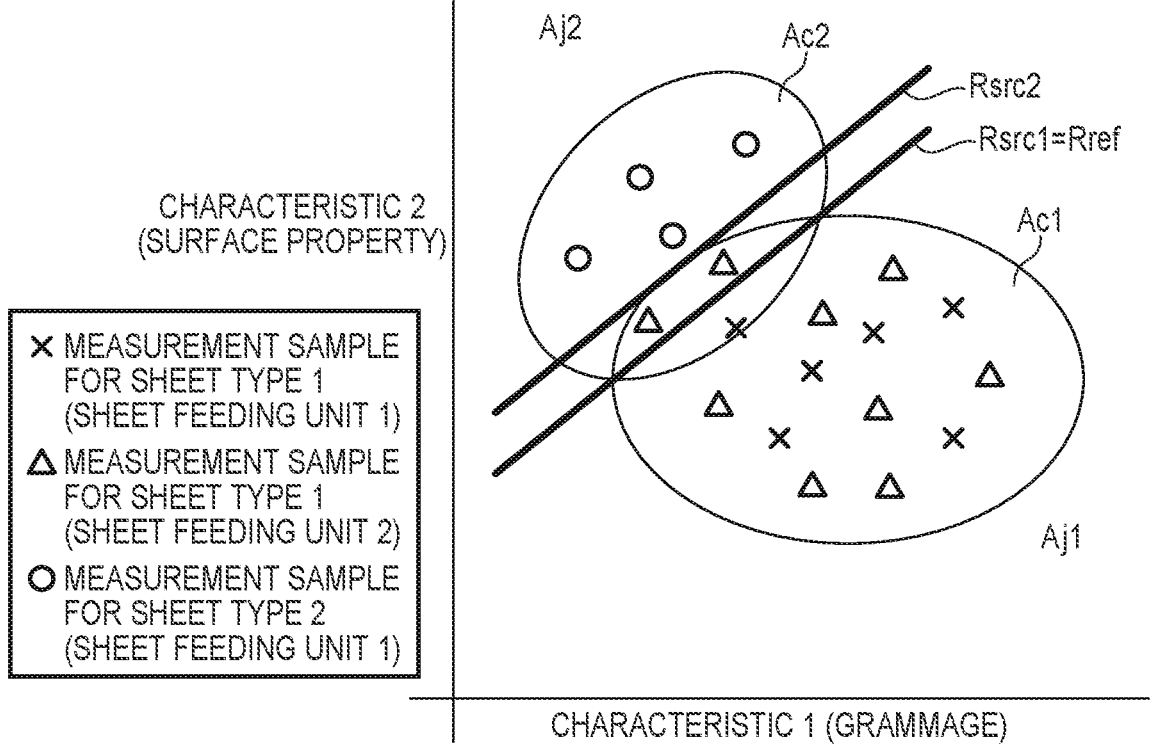
FIG. 8A illustrates an example of determination rule adjustment (second embodiment).

The operation changing unit 403 adjusts, for each sheet feeding unit, the determination rule 412 based on a result of analyzing an operation history by the history analysis unit 402. FIG. 8A illustrates a concrete example of the analysis model 411 and the determination rule 412 in the present embodiment and illustrates an example of adjustment of a determination rule for determining two types of sheets (sheet type 1 and sheet type 2) based on an analysis result indicated in FIG. 12C. In the example in FIG. 8A, similar to the example in FIG. 5B in the first embodiment, possible ranges (characteristic value ranges) of corresponding characteristic values overlap between the sheet type 1 and the sheet type 2.

In FIG. 8A, measurement samples indicating characteristic values sensed by the sensing device 30 are plotted for each sheet type and for each sheet feeding unit. In the present embodiment, as described above, with respect to the sheet feeding unit 1 in which a usage frequency of the sheet type 1 and a usage frequency of the sheet type 2 are about the same, a corresponding determination boundary Rsrc1 is not to be changed from the initial determination boundary Rref. Meanwhile, with respect to the sheet feeding unit 2 in which a usage frequency of the sheet type 1 is higher than that of the sheet type 2, a corresponding determination boundary Rsrc2 is adjusted so that the sheet type 1 whose usage frequency is high is to be preferentially identified as a determination result within a range in which the characteristic value ranges overlap. In the example in FIG. 8A, the determination boundary Rsrc2 is adjusted (from the initial determination boundary Rref) so as to contact a boundary of characteristic value range Ac1 of the sheet type 1. Thus, the determination rule 412 corresponding to each sheet feeding unit is adjusted based on a usage frequency of each type of a recording material in each sheet feeding unit.

By such adjustment of a determination boundary (determination rule 412) for each sheet feeding unit, it becomes possible, with respect to the sheet feeding unit 1, to minimize a possibility of erroneous determination occurring between the sheet type 1 and the sheet type 2, and with respect to the sheet feeding unit 2, to increase accuracy in determining of the sheet type 1 whose usage frequency is high. In other words, it becomes possible to accurately determine a recording material that is substantially being used by a user.

In the present embodiment, the control unit 110 (recording material determination unit 405), when determining a sheet type of a target recording material P based on a characteristic value(s) sensed by the sensing device 30 (step S104 in FIG. 6), applies the determination rule 412 corresponding to a sheet feeding unit of a sheet feeding source of the recording material. This determination rule 412 is separately adjusted for each sheet feeding unit as described above (step S110).

As described above, the control unit 110 (recording material determination unit 405) of the present embodiment adjusts the determination rule 412 corresponding to each sheet feeding unit based on a result of analyzing an operation history of each sheet feeding unit. In this manner, by adjusting the determination rule 412 of each sheet feeding unit, it becomes possible to increase accuracy in determining of a type of a recording material more so than in the first embodiment.

Third Embodiment

In a third embodiment, an example in which the control unit 110 (operation changing unit 403) performs, separately for each user, adjustment of the determination rule 412 based on a result of analyzing an operation history of the printer 100 will be described. In the following, description will be omitted for portions that are the same as the first embodiment and description will be given mainly for portions that are different from the first embodiment.

An example of a functional configuration of the control unit 110 in the present embodiment is the same as in the second embodiment (FIG. 7). However, in the present embodiment, the recording material determination unit 405 includes the determination rule 412 individually for each user that uses the printer 100.

As described above, the operation changing unit 403 of the first embodiment changes (adjusts) the determination rule 412, which is to be used by the recording material determination unit 405 and is the same across a plurality of users, based on a result of operation history analysis of the printer 100 by the history analysis unit 402. However, a case in which a type of a recording material (sheet type) to be used is different for each user can be assumed. For example, a type of an image (for example, graphics, text, or photo) to be printed by the printer 100 may be different for each user, or there may be a sheet type used only by a user who is involved in a specific service (for example, accounting service).

Assuming cases such as those described above, in the present embodiment, the history analysis unit 402 analyzes, for each user that uses the printer 100, an operation history of the printer 100. FIG. 12D indicates an example of a result of operation history analysis by the history analysis unit 402 in the present embodiment. The history analysis unit 402 analyzes an operation history in regards to image formation onto the most recent predetermined number (for example, 1040) of recording materials, and then saves the analysis result in the RAM 113 for each sheet feeding unit. The history analysis unit 402 acquires, separately for each user, data indicating a usage frequency of each sheet type as a result of analyzing an operation history. In the example in FIG. 12D, in regards to the sheet types 1 and 2, it is indicated that a usage frequency of the sheet type 2 is high for a user A and a usage frequency of the sheet type 1 is high for a user B and a user C.

Figure 8B:
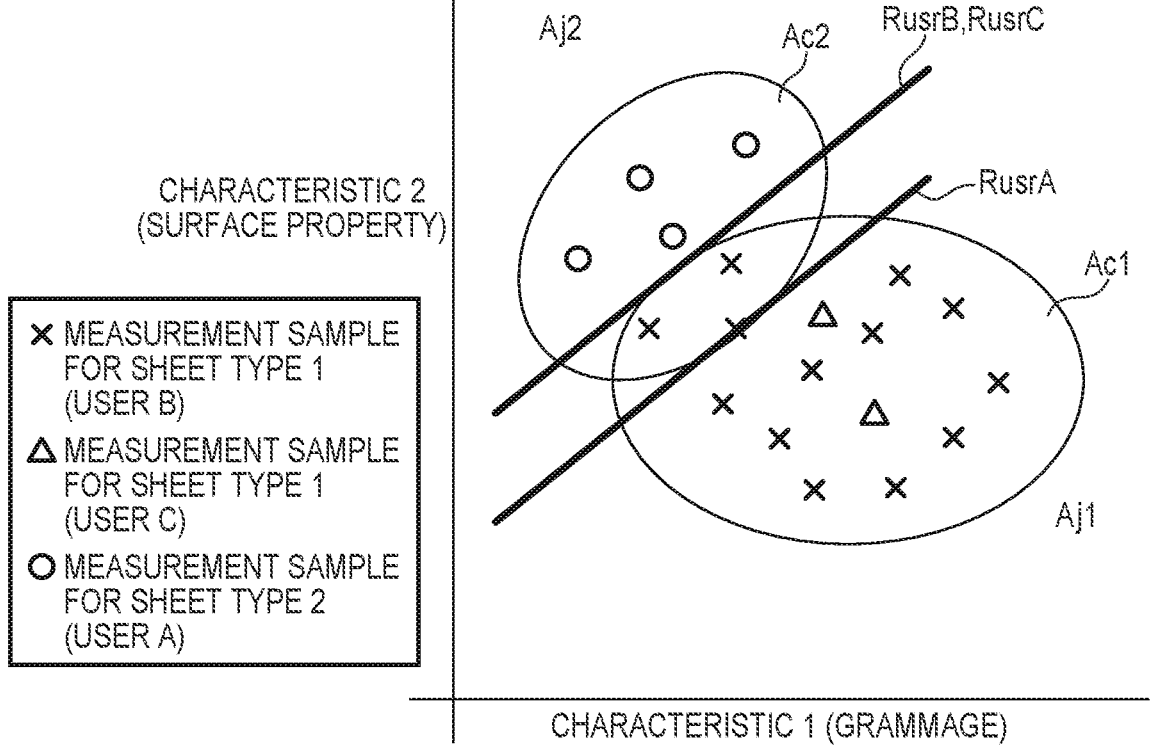
FIG. 8B illustrates an example of determination rule adjustment (third embodiment).

The operation changing unit 403 adjusts the determination rule 412 for each sheet feeding unit based on a result of analyzing an operation history by the history analysis unit 402. FIG. 8B illustrates a concrete example of the analysis model 411 and the determination rule 412 in the present embodiment and illustrates an example of adjustment of a determination rule for determining two types of sheets (sheet type 1 and sheet type 2) based on an analysis result indicated in FIG. 12D. In the example in FIG. 8B, similar to the example in FIG. 5B in the first embodiment, possible ranges (characteristic value ranges) of corresponding characteristic values overlap between the sheet type 1 and the sheet type 2.

In FIG. 8B, measurement samples indicating characteristic values sensed by the sensing device 30 are plotted for each sheet type and for each user. In the present example, between the sheet type 1 and the sheet type 2, the user A only uses the sheet type 2, and the user B and the user C only use the sheet type 1, and thus there is an unbalance in usage frequencies of sheet types between users. In such a case, a corresponding determination boundary is adjusted so that, for each user, a sheet type whose usage frequency is high is to be preferentially identified as a determination result. Thus, the determination rule 412 corresponding to each user is adjusted based on a usage frequency of each type of recording material for each user.

Specifically, as exemplified in FIG. 8B, a determination boundary RusrA corresponding to the user A is adjusted (from the initial determination boundary Rref) so as to contact a boundary of the characteristic value range Ac2 of the sheet type 2. In other words, in regards to the user A, a range in which a type of a recording material is determined as the sheet type 2 is broadened. Also, a determination boundary RusrB corresponding to the user B and the determination boundary RusrC corresponding to the user C is adjusted (from the initial determination boundary Rref) so as to contact a boundary of the characteristic value range Ac1 of the sheet type 1. In other words, in regards to the user B and the user C, a range in which a type of a recording material is determined as the sheet type 1 is broadened.

In the present embodiment, the control unit 110 (recording material determination unit 405), when determining a sheet type of a target recording material P (step S104 in FIG. 6) based on a characteristic value(s) sensed by the sensing device 30, applies the determination rule 412 corresponding to the user related to the job. This determination rule 412 is separately adjusted for each user as described above (step S110).

As described above, the control unit 110 (recording material determination unit 405) of the present embodiment adjusts the determination rule 412 corresponding to each user based on a result of analyzing an operation history for each user of the printer 100. As described above, by adjusting the determination rule 412 for each user, it becomes possible to increase accuracy in determining a type of a recording material more so than in the first embodiment. In other words, it becomes possible to accurately determine a recording material that is substantially being used by a user.

Note that the present embodiment may be combined with the second embodiment. Also, in the present embodiment, it is possible to adjust the determination rule 412 by combining another condition such as a time period.

Fourth Embodiment

In a fourth embodiment, an example in which the control unit 110 determines a reliability of the adjusted determination rule 412, and if it determines that the reliability has decreased, resets the determination rule 412 will be described. In the following, description will be omitted for portions that are the same as the first embodiment and description will be given mainly for portions that are different from the first embodiment.

<Control Unit>

Figure 9:
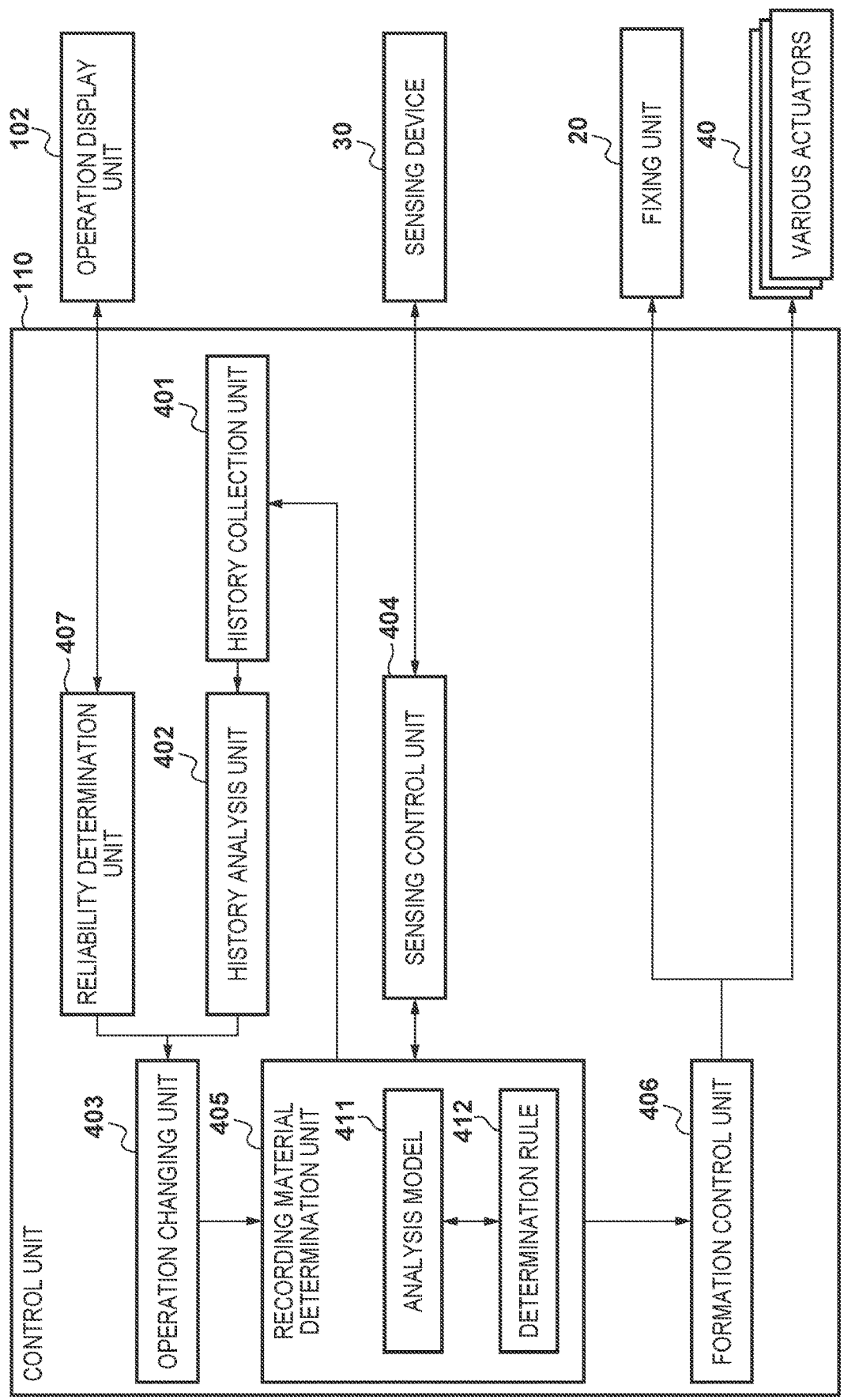
FIG. 9 is a block diagram illustrating an example of a functional configuration of a control unit (fourth embodiment).

FIG. 9 is a block diagram illustrating an example of a functional configuration of the control unit 110 in the present embodiment. The present embodiment differs from the first embodiment in that the control unit 110 further includes a reliability determination unit 407. The reliability determination unit 407 includes a function for collecting and analyzing information related to a reliability of the determination rule 412 and for determining the reliability. The reliability determination unit 407 may reference a result of operation history analysis by the history analysis unit 402. Also, the reliability determination unit 407 may perform transmission/reception of instructions or information to/from the operation display unit 102.

As described above, the operation changing unit 403 of the first embodiment changes (adjusts) the determination rule 412, which is to be used by the recording material determination unit 405, based on a result of operation history analysis of the printer 100 by the history analysis unit 402. However, in a case where, for example, a sheet type that is typically used by a user is changed after adjustment of the determination rule 412, there may arise a situation in which a reliability of the determination rule 412 that is currently in use decreases. Even in a case where the reliability of the determination rule 412 decreases, it may be possible to restore the reliability by performance of adjusting the determination rule 412 at a stage at which an operation history of the printer 100 is sufficiently accumulated. However, in a case where it takes time to accumulate the operation history of the printer 100, there may arise a situation in which the determination rule 412 whose reliability has decreased is continually used.

Accordingly, in the present embodiment, the reliability determination unit 407 determines the reliability of the determination rule 412 used by the recording material determination unit 405, and notifies the determination result to the operation changing unit 403. The operation changing unit 403, when it is determined by the reliability determination unit 407 that the reliability of the determination rule 412 has decreased, resets (for example, to the initial determination boundary Rref) the determination rule 412 to be used by the recording material determination unit 405.

<Processing Procedure>

Figure 10:
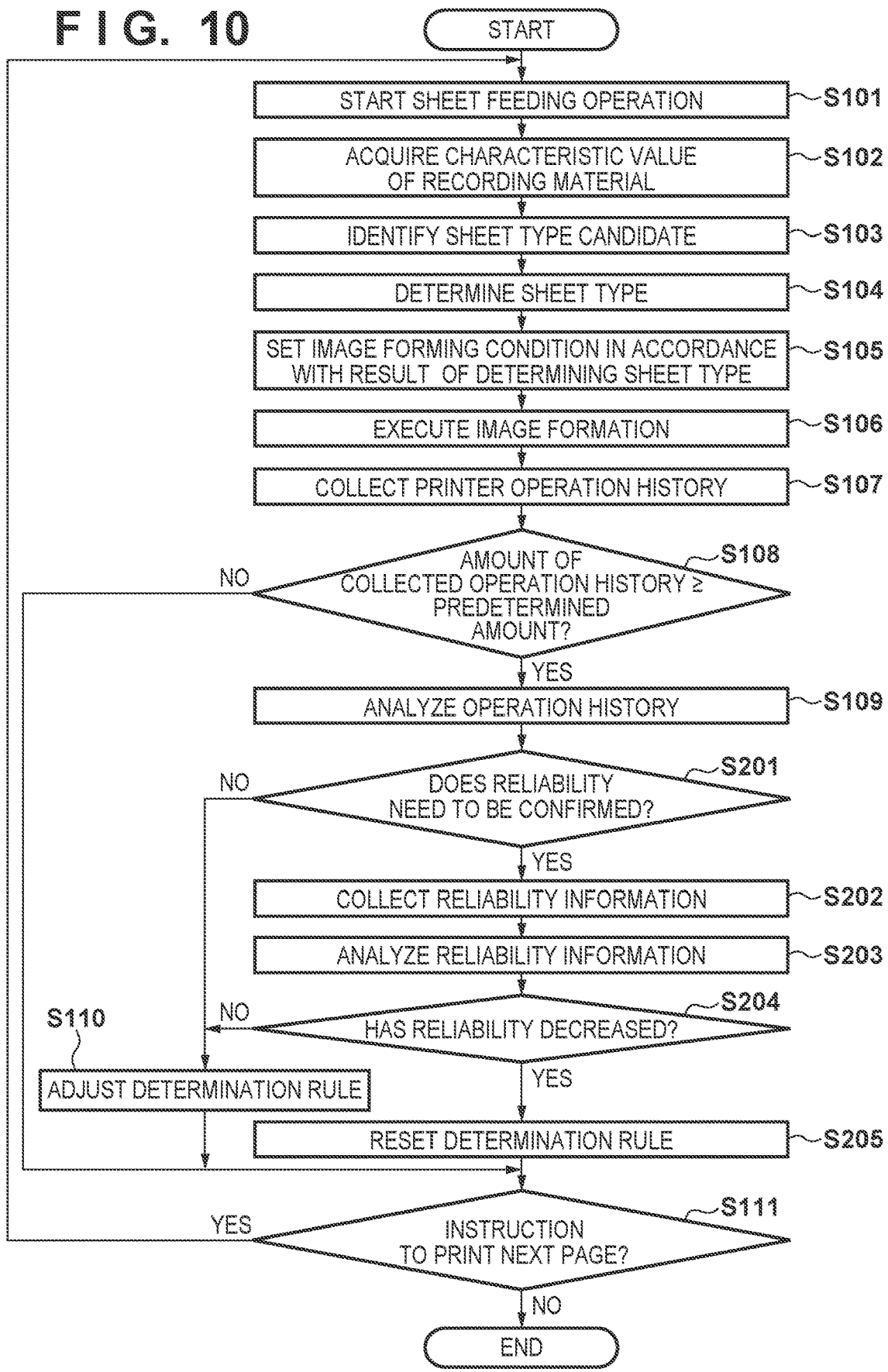
FIG. 10 is a flowchart illustrating a sequence of processing executed by the control unit (fourth embodiment).

Next, a processing procedure to be executed by the control unit 110 in the present embodiment will be described with reference to a flowchart in FIG. 10. In the processing procedure of the present embodiment, steps S201 to S205 are added to the processing procedure of the first embodiment (FIG. 6).

In the present embodiment, the control unit 110, in steps S101 to S109, executes the same processing as in the first embodiment. The control unit 110 (history analysis unit 402), in step S109, performs analysis of the latest operation history of the printer 100, and when it stores the analysis result in the RAM 113, advances the processing to step S201.

In step S201, the control unit 110 (reliability determination unit 407) determines whether or not the reliability needs to be confirmed in regards to the determination rule 412 in use. For example, the control unit 110 determines that the reliability of the determination rule 412 needs to be confirmed, in a case where a tendency of a sheet type to be a candidate (identified in in step S103) is changed from when a determination rule RL was last adjusted and there are a plurality of sheet types to be candidates in the most recent operation history. The control unit 110, in a case where it determines that the reliability of the determination rule 412 does not need to be confirmed, advances the processing to step S110. In step S110, the control unit performs adjustment of the determination rule 412 based on a result of analyzing the operation history of the printer 100, and advances the processing to step S111. Meanwhile, the control unit 110, in a case where it determines that the reliability of the determination rule 412 needs to be confirmed, advances the processing to step S202.

In step S202, the control unit 110 (reliability determination unit 407) collects, as reliability information indicating the reliability of the determination rule 412, a result of an input by a user by displaying on the operation display unit 102 a confirmation screen illustrated in FIG. 11. In the confirmation screen illustrated in FIG. 11, a confirmation regarding print quality with the user is performed. Further, in step S203, the control unit 110 (reliability determination unit 407) analyzes the reliability of the current determination rule 412 based on the collected reliability information. In the present embodiment, in a case where the user selects "YES" in the confirmation screen illustrated in FIG. 11, it is determined that the reliability is high (in other words, maintained), and in a case where the user selects "NO", it is determined that the reliability is low (in other words, decreased).

Then, in step S204, the control unit 110 (reliability determination unit 407) determines whether or not the reliability of the determination rule 412 has decreased, and in a case where the reliability has not decreased, advances the processing to step S110. In step S110, the control unit performs adjustment of the determination rule 412 based on a result of analyzing the operation history of the printer 100, and advances the processing to step S111. Meanwhile, the control unit 110, in a case where it determines that the reliability of the determination rule 412 has decreased, advances the processing to step S205. In step S205, the control unit 110 (operation changing unit 403) resets the determination rule 412 to the initial determination rule, and advances the processing to step S111.

As described above, by virtue of this embodiment, it becomes possible to, in a case where the reliability of the determination rule 412 has decreased, execute at an earlier timing an operation for improving accuracy in determining a type of a recording material. By this, it becomes possible to increase accuracy in determining of a type of a recording material even more than in the first embodiment.

Note that collection and analysis of reliability information is not limited to the above method, and for example, display content of the confirmation screen illustrated in FIG. 11 may be changed in accordance with the determination rule 412. In determination of the reliability of the determination rule 412 (step S204), an input in regards to a plurality of items may be received from a user via the confirmation screen and analysis of the reliability may be performed based on the input content in regards to the plurality of items.

Fifth Embodiment

In each of the above embodiments, analysis of operation history of the printer 100 and adjustment of a determination rule based on the analysis result thereof are performed within the printer 100. In the present embodiment, an example in which these processes are performed in a server apparatus (management server) capable of communicating with the printer 100 will be described. In the following, description will be omitted for portions that are the same as the first embodiment and description will be given mainly for portions that are different from the first embodiment.

<System Configuration>

Figure 13:
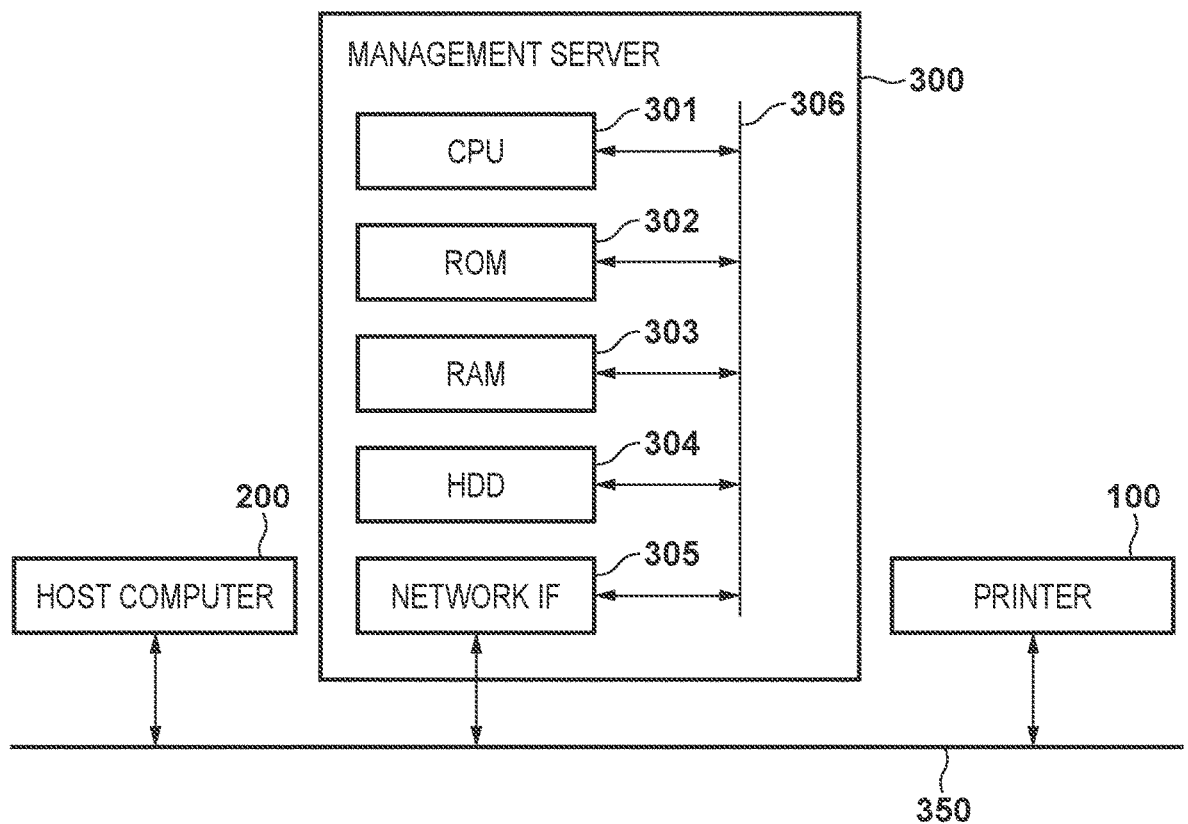
FIG. 13 is a block diagram illustrating an example of a configuration of a communication system and an example of a hardware configuration of a management server (fifth embodiment).

FIG. 13 is a block diagram illustrating an example of a configuration of a communication system and an example of a hardware configuration of a management server in the present embodiment. In a communication system of the present embodiment, the printer 100 is connected with the management server 300 via a network 350 so as to be able to communicate with the management server 300. The network 350 may be configured by any network such as a wired LAN, a wireless LAN, and the Internet. Note that the printer 100 can communicate with an external apparatus such as the host computer 200 via the network 350.

The management server 300 includes a CPU 301, a ROM 302, a RAM 303, a hard disk drive (HDD) 304, and a network interface (I/F) 305, and these devices are connected to a system bus 306. The CPU 301 controls an operation of the entire management server 300 by loading into the RAM 303 a control program stored in the ROM 302 or the HDD 304 and executing the loaded program.

The ROM 302 stores various programs such as a control program that can be executed by the CPU 301. The RAM 303 mainly functions as a main memory, a work area and the like of the CPU 301. The HDD 304 stores various data such as a boot program and various applications. Note that a memory such as an SD card or flash memory may be used as an auxiliary storage device in place of the HDD 304. The network I/F 305 performs data communication with an external apparatus via a network.

<Control Configuration>

Figure 14:
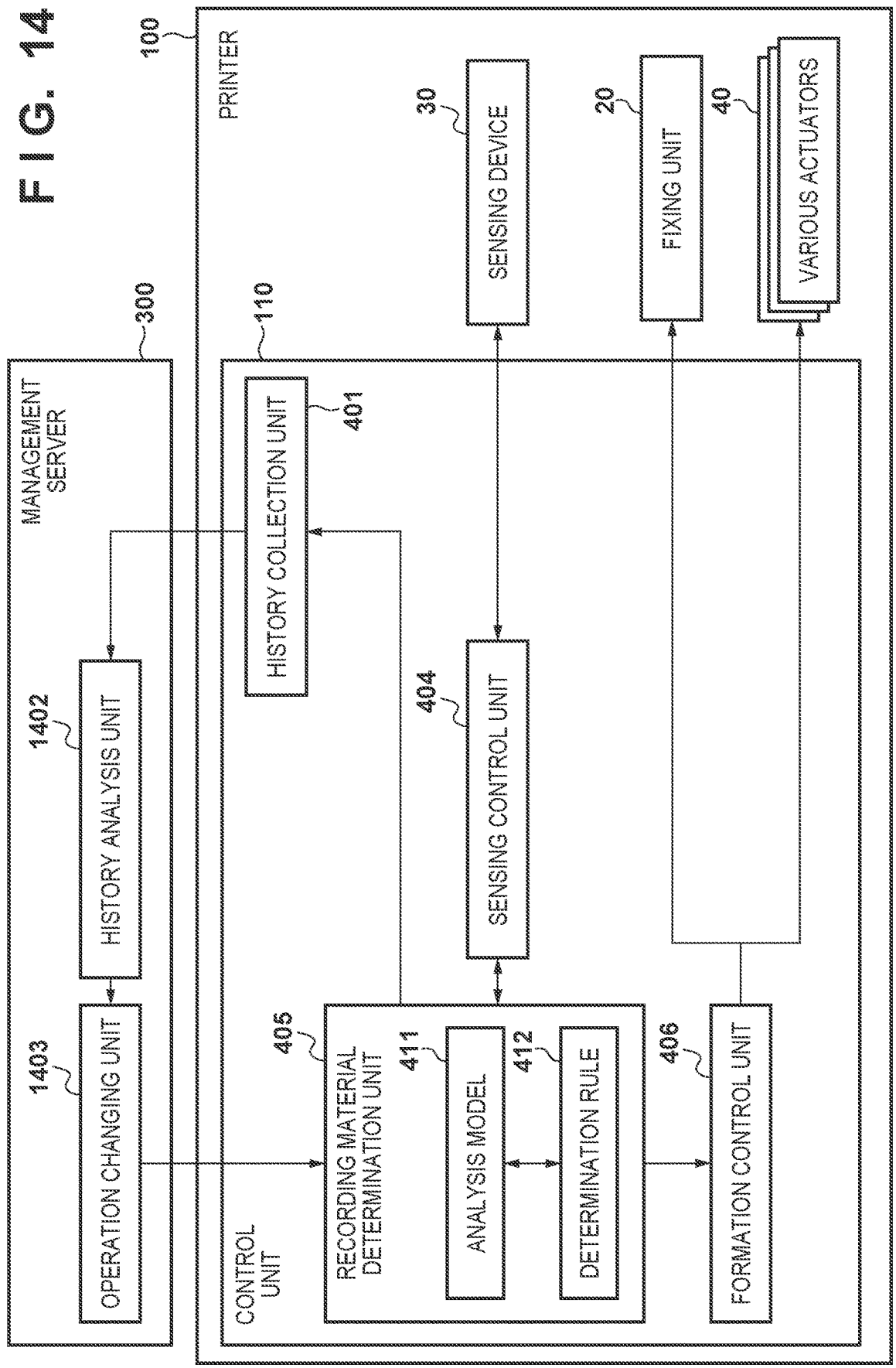
FIG. 14 is a block diagram illustrating an example of a functional configuration of a printer 100 and a management server 300 (fifth embodiment).

FIG. 14 is a block diagram illustrating an example of a functional configuration of the printer 100 and the management server 300 in the present embodiment. As illustrated in FIG. 14, in the present embodiment, the history analysis unit 402 and the operation changing unit 403 (FIG. 4) in the first embodiment are arranged in the management server 300 as a history analysis unit 1402 and an operation changing unit 1403, respectively.

Each function unit within the control unit 110 illustrated by a block in FIG. 14 is realized in the printer 100 by the CPU 111 based on programs stored in the ROM 112 and data stored in the RAM 113. Also, the history analysis unit 1402 and the operation changing unit 1403 are realized in the management server 300 by the CPU 301 based on programs stored in the ROM 302 and data stored in the RAM 303.

The history analysis unit 1402 and the operation changing unit 1403 respectively have the same functions as the history analysis unit 402 and the operation changing unit 403 in the first embodiment. However, in the present embodiment, the history collection unit 401 transmits the collected operation history to the management server 300 via the network 350. The history analysis unit 1402 receives the operation history of the printer 100 from the printer 100 (history collection unit 401), and performs analysis of the received operation history.

Also, the operation changing unit 1403 adjusts (changes) the determination rule 412 to be used by the printer 100 (recording material determination unit 405), based on the operation history received from the printer 100 (history collection unit 401). More specifically, the operation changing unit 1403 adjusts, based on a result of operation history analysis by the history analysis unit 1402, the determination rules 412 for the printer 100 stored in the RAM 303 or the HDD 304. The operation changing unit 1403 also transmits to the printer 100 data indicating the adjustment result of the determination rule 412.

In the printer 100, the recording material determination unit 405, when it receives from the management server 300 data indicating the adjustment result of the determination rule 412, updates the determination rule 412 in use based on the received data. The recording material determination unit 405 performs a determination process for determining a type of a recording material P based on the updated determination rule 412 and characteristic values sensed by the sensing device 30.

<Processing Procedure>

In the present embodiment, the processing in steps S109 and S110 is performed by the management server 300 in the processing procedure indicated in FIG. 6 of the first embodiment. Specifically, the processing in steps S101 to S108 is the same as that in the first embodiment. However, in step S108, the control unit 110 (history analysis unit 402), in a case where the collected amount is the predetermined amount or more, transmits to the management server 300 the collected operation history, and advances the processing to step S109.

In step S109, the CPU 301 (history analysis unit 1402) of the management server 300 performs analysis of the operation history received from the printer 100. Further, in step S110, the CPU 301 (operation changing unit 1403) performs adjustment of the determination rule 412 based on a result of analyzing the operation history of the printer 100, and transmits to the printer 100 data indicating the adjustment result. In the printer 100, the control unit 110 (recording material determination unit 405) updates the determination rule 412 in use based on data received from the management server 300. By this, adjustment of the determination rule 412 in the printer 100 is completed.

As described above, in the present embodiment, analysis of the operation history of the printer 100 and adjustment of a determination rule based on the analysis result are performed in the management server 300 (server apparatus) capable of communicating with the printer 100. In such a case, it is possible to obtain the same advantage as the first embodiment.

Note that the present embodiment may be combined with the above-described second to fourth embodiments. In other words, a communication system may be configured so that analysis of the operation history of the printer 100 and adjustment of the determination rule based on the analysis result in the second to fourth embodiments are executed in the management server 300 as in the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-007835, filed Jan. 21, 2020, and No. 2021-001046, filed on Jan. 6, 2021, which are hereby incorporated by reference herein in their entirety.

What is claimed is:

1. An image forming apparatus comprising:
   a sensing device that detects a characteristic value indicating a characteristic of a recording material fed from a sheet feeding unit;
   at least one memory that stores instructions; and
   at least one processor that executes the instructions to:
   determine a type of a recording material based on the characteristic value detected by the sensing device and a determination rule for determining a type of a recording material;
   control an image forming condition for performing the image formation onto the recording material in accordance with the determined type of the recording material;
   collect an operation history of the image forming apparatus;
   adjust the determination rule based on the collected operation history;
   display, on a display unit of the image forming apparatus, a confirmation screen for confirming, by a user, a quality of an image to be formed on the recording material, and determining a reliability of the determination rule based on an input of the user via the confirmation screen; and
   resetting the determination rule in a case in which it is determined that the reliability of the determination rule decreased after adjustment of the determination rule.

2. The image forming apparatus according to claim 1, wherein
   the determination rule defines a boundary between a range of characteristic values for which a type of a recording material is determined to be a first type, and a range of characteristic values for which a type of a recording material is determined to be a second type, and
   the at least one processor executes the instructions to adjust the boundary based on the operation history.

3. The image forming apparatus according to claim 1, wherein
   the at least one processor executes the instructions to adjust the determination rule based on a usage frequency of each type of recording material obtained as a result of analyzing the operation history.

4. The image forming apparatus according to claim 3, wherein
   the at least one processor executes the instructions to adjust the determination rule such that a type of a recording material whose usage frequency is high is identified as a result of determining the type of the recording material with priority over a type of a recording material whose usage frequency is low.

5. The image forming apparatus according to claim 2, wherein
   the at least one processor executes the instructions to, based on a usage frequency of each type of recording material obtained as a result of analyzing the operation history, adjust the boundary so as to broaden the range corresponding to a type whose usage frequency is higher between the first type and the second type.

6. The image forming apparatus according to claim 2, wherein
   the at least one processor executes the instructions to adjust the boundary such that, within a range in which a possible range of characteristic values for the first type of a recording material and a possible range of characteristic values for the second type of a recording material overlap, a type of a recording material whose usage frequency is higher between the first type and the second type is identified as a result of determining the type of the recording material.

7. The image forming apparatus according to claim 1, wherein
   the determination rule is provided individually for each sheet feeding unit which is to be a sheet feeding source of a recording material, and
   the at least one processor executes the instructions to adjust the determination rule corresponding to each sheet feeding unit based on a result of analyzing the operation history for each sheet feeding unit.

8. The image forming apparatus according to claim 7, wherein
   the at least one processor executes the instructions to adjust the determination rule corresponding to each sheet feeding unit based on a usage frequency of each type of recording material in each sheet feeding unit.

9. The image forming apparatus according to claim 1, wherein
   the determination rule is provided individually for each user of the image forming apparatus, and
   the at least one processor executes the instructions to adjust adjust the determination rule corresponding to each user based on a result of analyzing the operation history of each user.

10. The image forming apparatus according to claim 9, wherein
    the at least one processor executes the instructions to adjust the determination rule corresponding to each user based on a usage frequency of each type of a recording material for each user.

11. The image forming apparatus according to claim 1, wherein
    the sensing device detects, as the characteristic value, a grammage of the recording material and a value indicating a surface property of the recording material.

12. The image forming apparatus according to claim 1, further comprising:
    an image forming unit,
    wherein the at least one processor executes the instructions to set the image forming condition in accordance with the type of the recording material, and control the image forming unit to perform image formation onto the recording material in accordance with the set image forming condition.

13. The image forming apparatus according to claim 1, wherein
    the image forming condition includes at least one of a fixing temperature for fixing an image onto the recording material, a transfer voltage or a transfer current supplied to a transfer unit that transfers an image onto the recording material, and a speed for conveying the recording material.

14. A communication system that comprises an image forming apparatus and a server apparatus capable of communicating with the image forming apparatus,
    wherein the image forming apparatus comprises:
    a sensing device that detects a characteristic value indicating a characteristic of a recording material fed from a sheet feeding unit;

at least one first memory that stores instructions; and
at least one first processor that executes the instructions to:
- determine a type of a recording material based on the characteristic value detected by the sensing device and a determination rule for determining a type of a recording material;
- control an image forming condition for performing the image formation onto the recording material in accordance with the determined type of the recording material; and
- collect an operation history of the image forming apparatus, and transmit the collected operation history to the server apparatus, and wherein the server apparatus comprises:
at least one second memory that stores instructions; and
at least one second processor that executes the instructions to:
- adjust the determination rule that is held in the server apparatus and corresponds to the image forming apparatus, based on the operation history received from the image forming apparatus; and
- transmit, to the image forming apparatus, data indicating a result of adjusting the determination rule, wherein in the image forming apparatus, the at least one first processor executes the instructions to further update the determination rule based on the data received from the server apparatus, and wherein in the server apparatus, the at least one second processor executes the instructions to further determine a reliability of the determination rule based on an input of a user via a confirmation screen displayed on a display unit of the image forming apparatus for confirming, with a user, a quality of an image to be formed onto the recording material, and resetting the determination rule in a case in which it is determined that the reliability decreased after adjustment of the determination rule.

* * * * *